United States Patent [19]
Blount

[11] Patent Number: 5,152,257
[45] Date of Patent: Oct. 6, 1992

[54] ROTARY-RECIPROCAL COMBUSTION ENGINES

[76] Inventor: David H. Blount, 6728 Del Cerro Blvd., San Diego, Calif. 92120

[21] Appl. No.: 560,868

[22] Filed: Jul. 31, 1990

[51] Int. Cl.[5] .............................................. F02B 53/00
[52] U.S. Cl. ................................. 123/45 A; 123/241; 418/68
[58] Field of Search .................... 123/45 R, 45 A, 241; 418/68

[56] References Cited

U.S. PATENT DOCUMENTS

| | | | |
|---|---|---|---|
| 908,916 | 1/1909 | Weinat | 418/68 |
| 1,229,590 | 6/1917 | Dawe | 418/68 |
| 1,736,822 | 11/1929 | Dreisbach | 123/45 A |
| 1,817,663 | 8/1931 | Ashworth | 418/68 |
| 3,667,876 | 6/1972 | Boyd | 123/45 A |

FOREIGN PATENT DOCUMENTS

| | | | |
|---|---|---|---|
| 27071 | of 1914 | United Kingdom | 123/45 A |
| 13677 | 8/1916 | United Kingdom | 123/45 A |

Primary Examiner—John J. Vrablik

[57] ABSTRACT

This invention relates to an apparatus for producing a rotary motion force by means of an internal combustion engine, rotary-reciprocal type, consisting of a housing, a rotor and a shaft combined with a rotor's guiding system, fuel intake system and an ignition system. This internal combustion engine has many uses which are commonly known but this apparatus may also be used as a compressor, as a pump, as an engine powered by an expanding heating liquid or gas or a combination of the above.

10 Claims, 22 Drawing Sheets

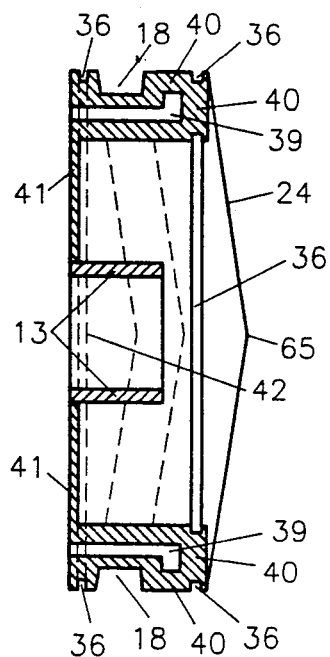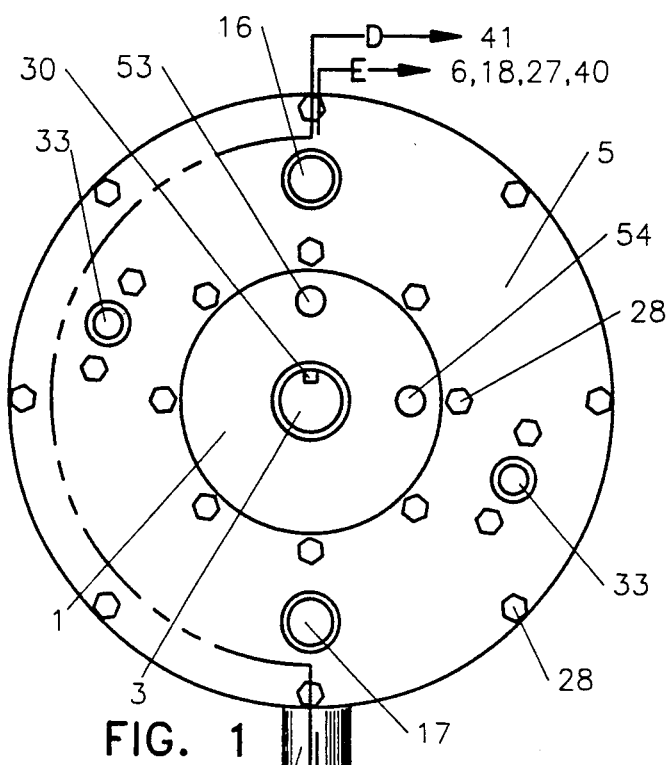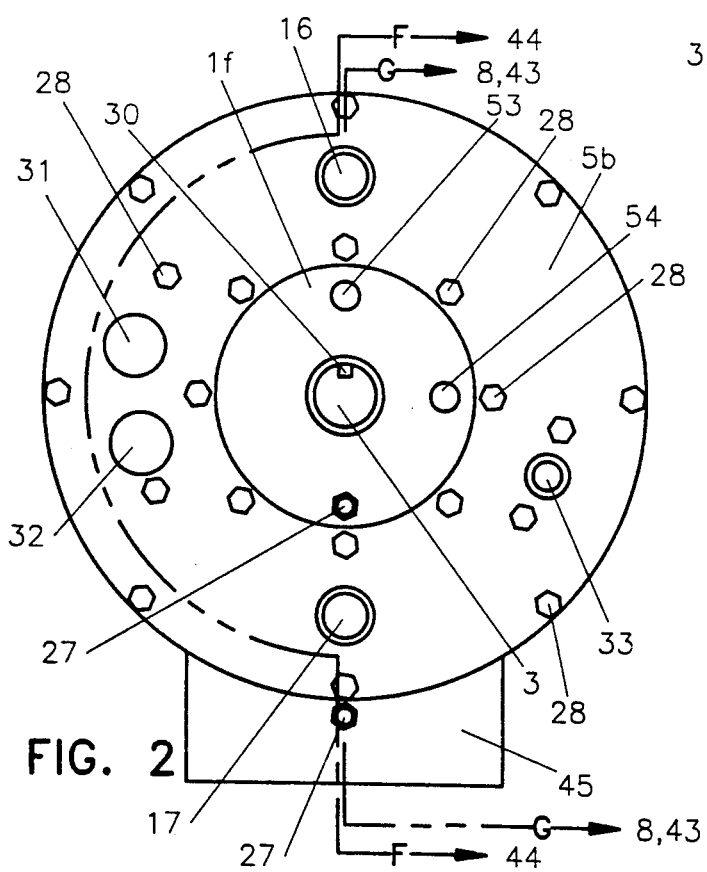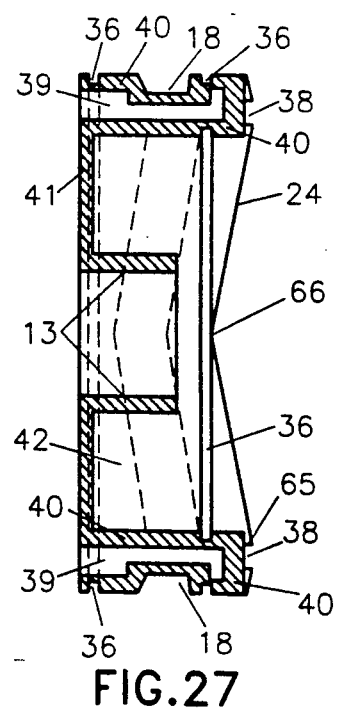
FIG. 10
FIG. 1
FIG. 2
FIG. 27

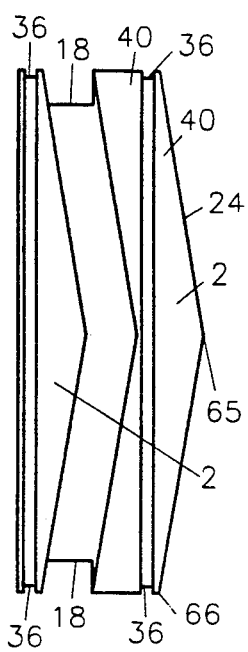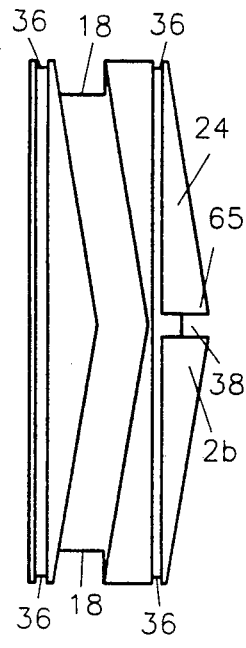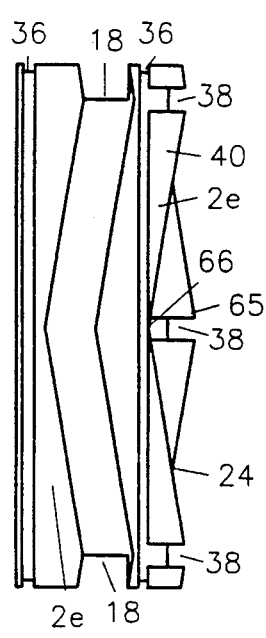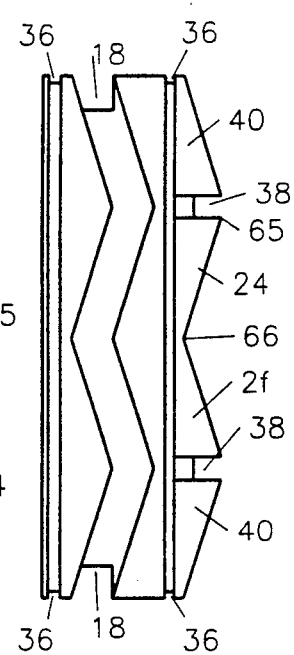
FIG. 9　　FIG. 13　　FIG. 26　　FIG. 32
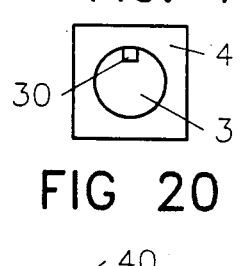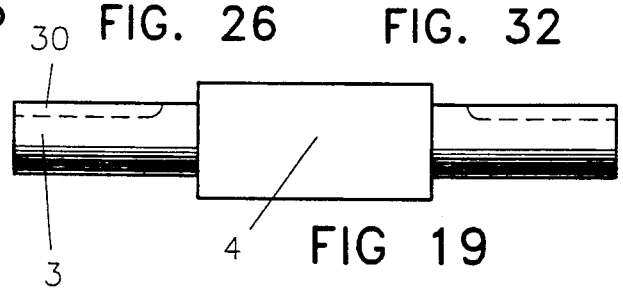
FIG 20　　FIG 19
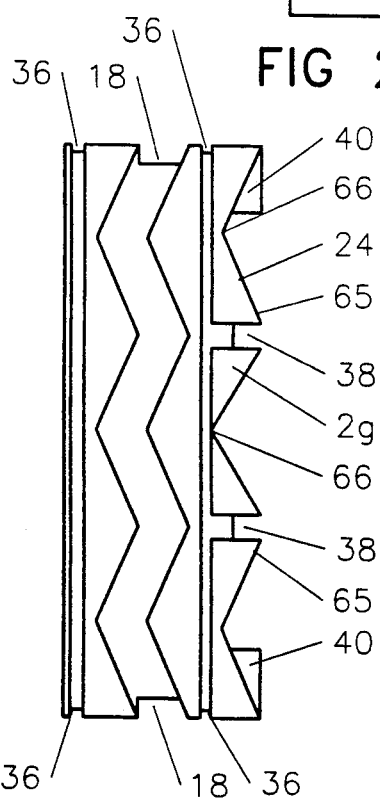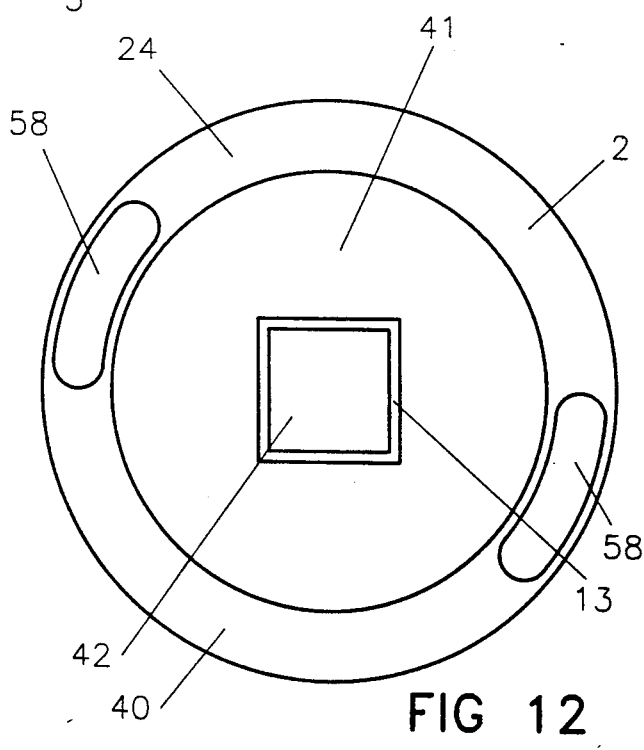
FIG. 35　　FIG 12

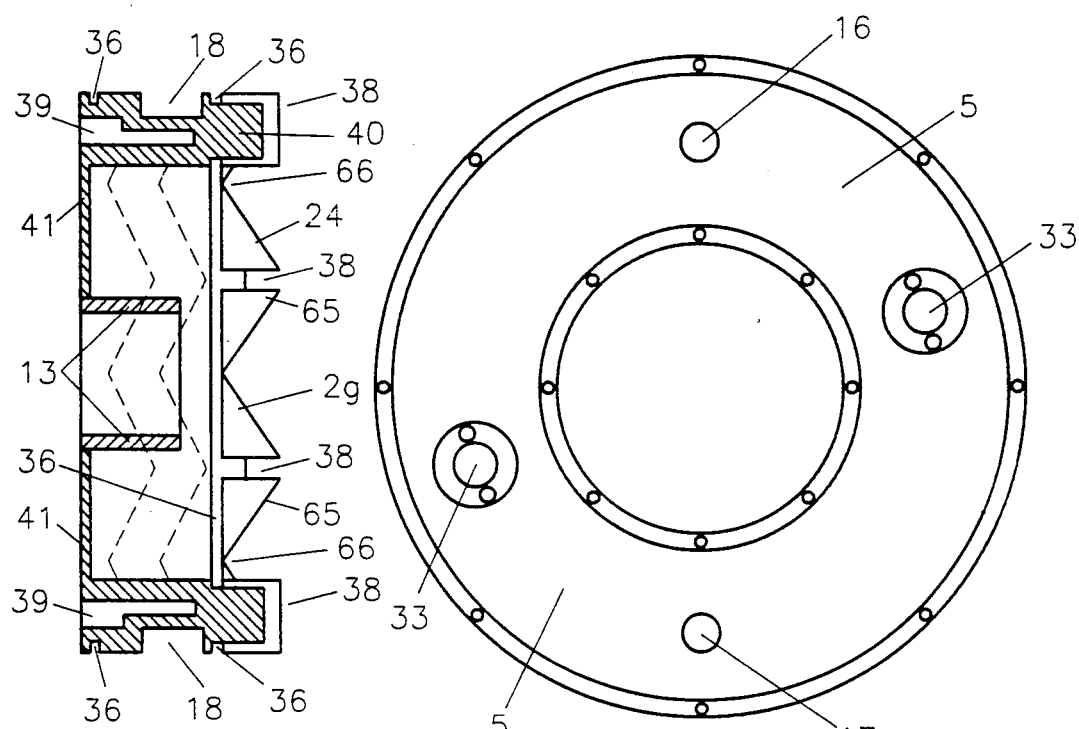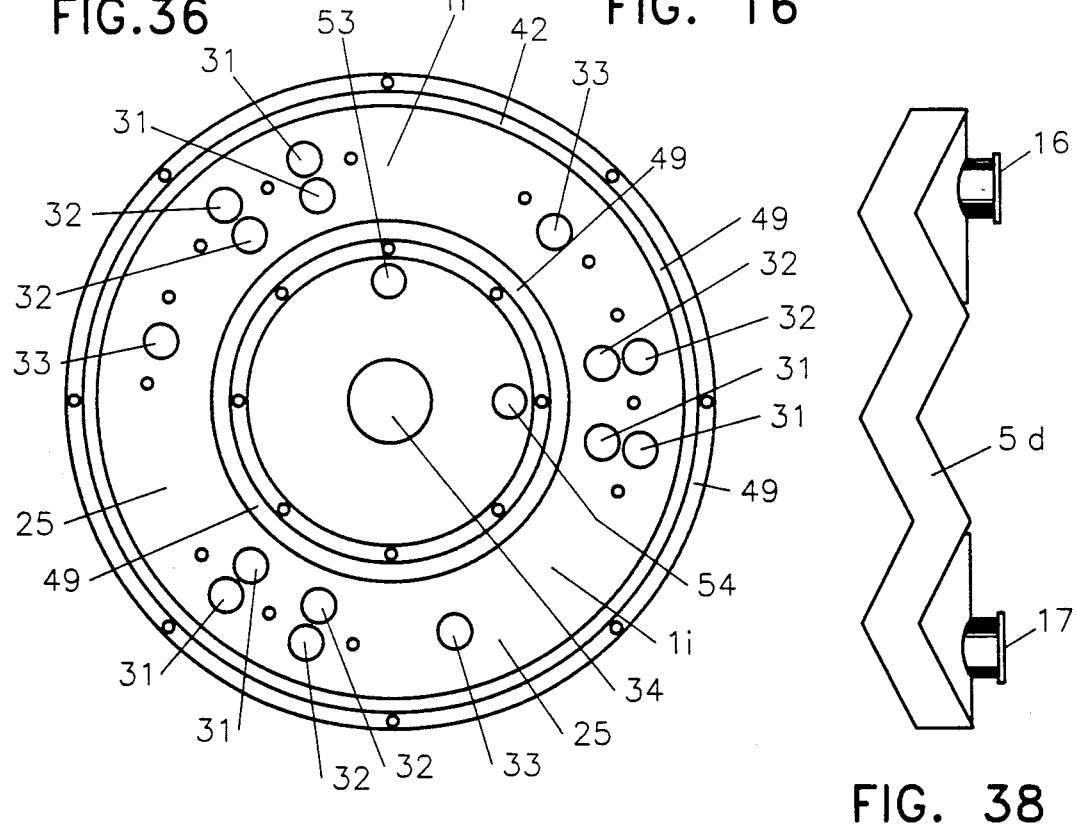

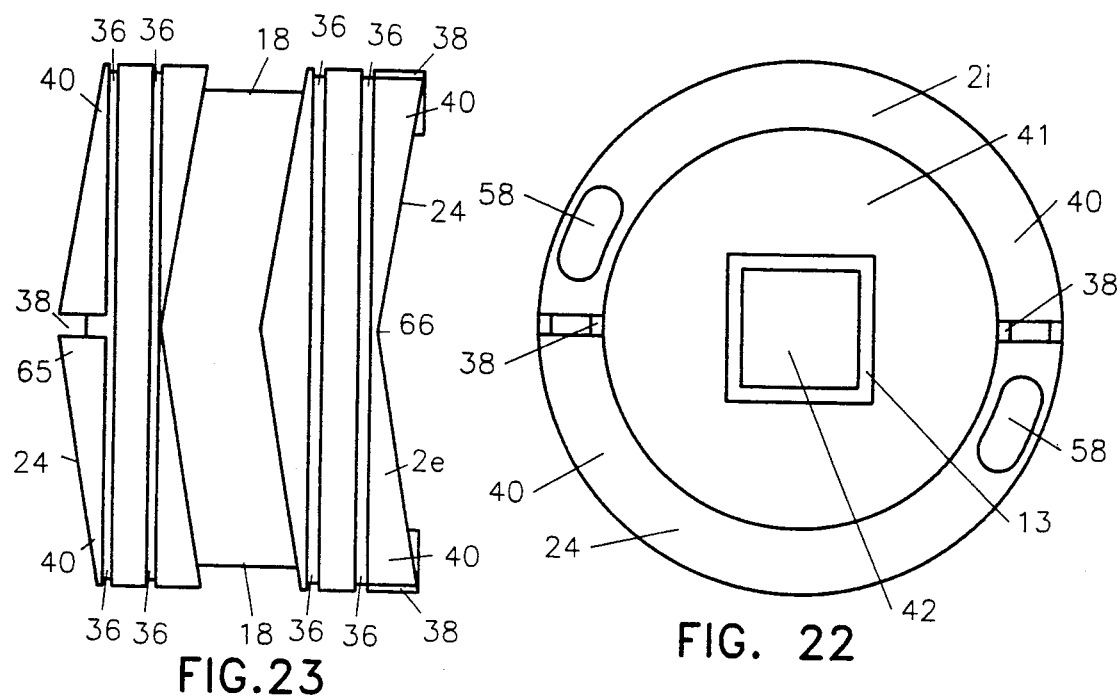
FIG. 23
FIG. 22
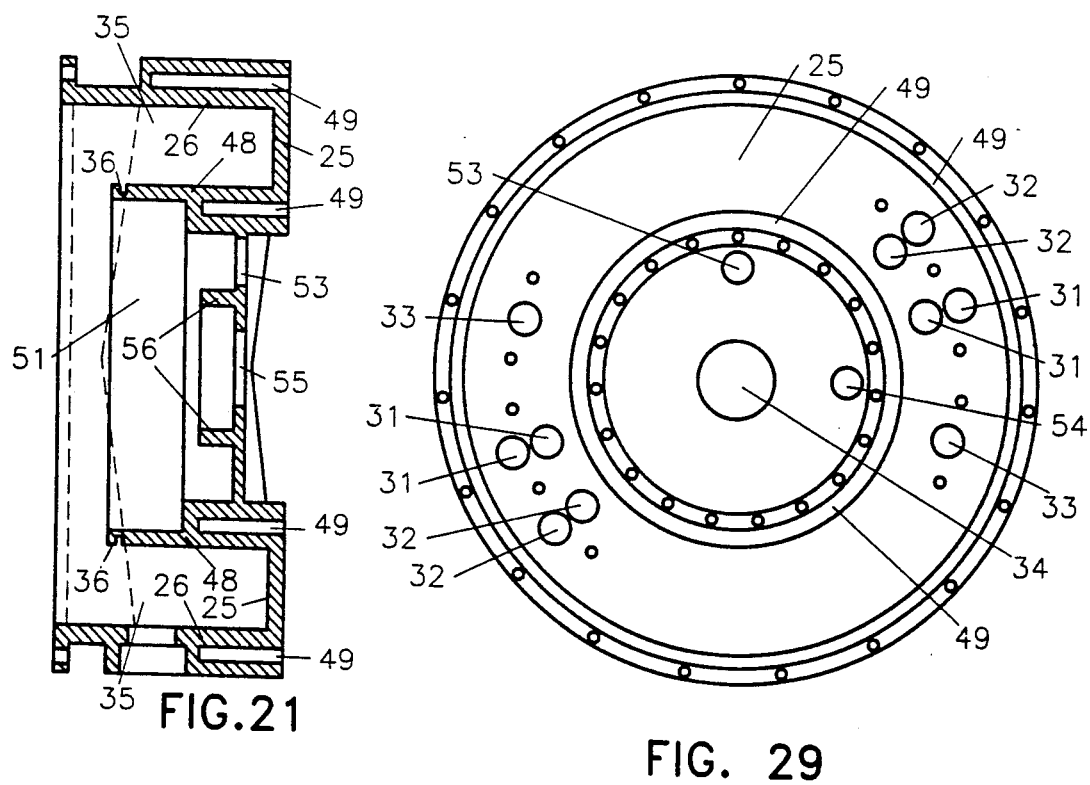
FIG. 21
FIG. 29

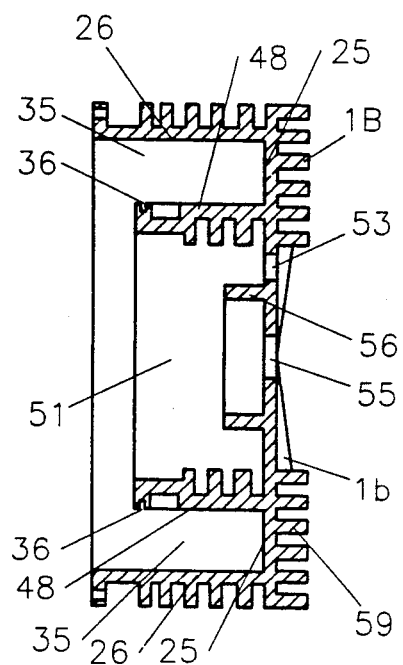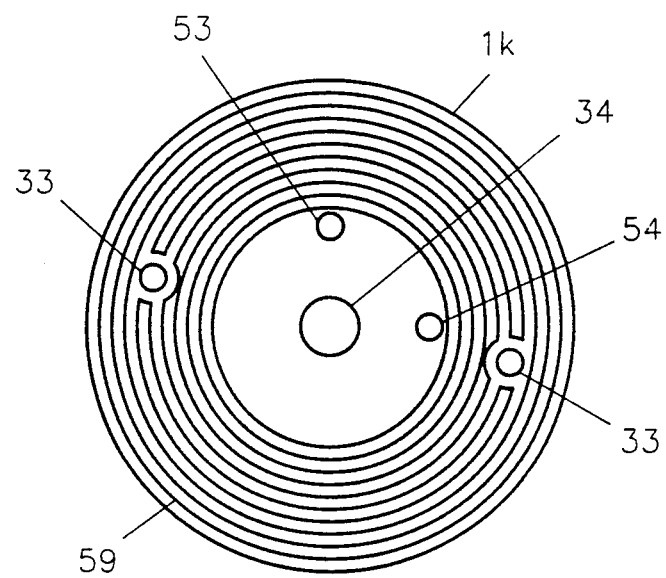
FIG. 49　　　　FIG. 48
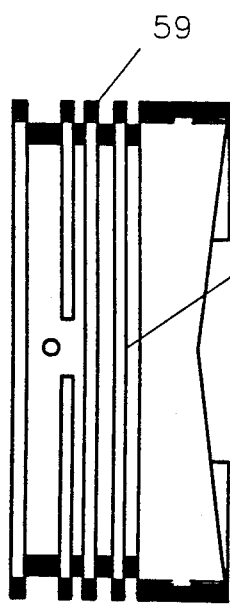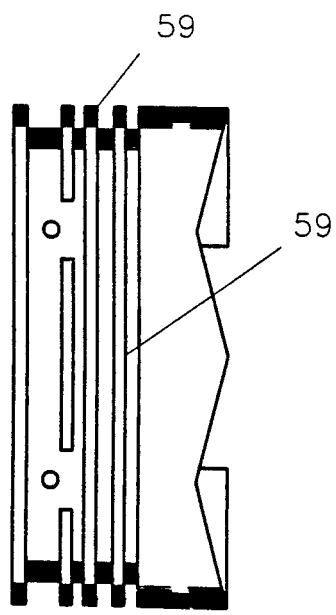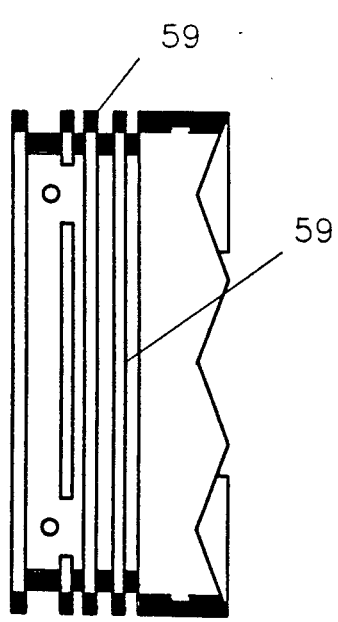
FIG. 50　　FIG. 51　　FIG. 52

ROTARY-RECIPROCAL COMBUSTION ENGINES

BACKGROUND OF THE INVENTION

The invention relates to an apparatus for producing a rotary motion force by means of an internal combustion engine of the rotary-reciprocal type, provided with a rotor which has a circular shaped piston on the lateral peripheral area of the rotor and which is rotarilly and reciprocately mounted on a centrally located engine shaft in a fixed housing having a cavity formed by a circular peripheral wall and two side walls.

Many rotary engines have been invented in the past such as the Agostino Ramelli's water pump, James Watts rotary steam engine, Gilbert's engine, Cooley's engine, Selwood engine, Wankel, Walter engine, Farwell engine, Mercer engine, Porsche rotary engines, Virmel engine, Kauertz engine, Jernals, Geiger engine, Franke engine and others.

Previous known rotary engines came in four main groups:
1. Scissor actions types with pistons or vanes
2. Eccentric-rotor type
3. Eccentric-multi rotor type
4. Revolving-block type The improved engine of this invention is of the novel rotary-reciprocal type wherein the circular rotor reciprocates on the centrally located engine shaft while rotating the engine shaft. The rotary and reciprocal motion is guided by a rotary and reciprocal guide. The engine of this invention is entirely different from the four types of engines listed above.

The present novel rotary-reciprocal apparatus of this invention may be utilized as an internal combustion engine, as a combination of an internal combustion engine and a compressor and/or pump, as a steam engine, as a pump and as a gas compressor, as an engine powered by expanding heated liquids or gases.

The basic rotary reciprocal internal combustion engine of this invention consist of stationary cylindrical housing having a laterally and peripherally placed cylinder chambers, a central compression chamber and a posterior compression chamber, a circular rotor consisting of a laterally and peripherally placed piston, a side wall on the rotor which has a centrally located hub, a centrally located engine shaft consisting of an unround (square, hexagon, triangular, etc.) shape in the center and round ends which protrude out the center of the housing's side walls, a reciprocal and rotary guiding system, an ignition system, a gases mixture intake port and an exhaust port. The housing's chambers are separated by the rotor and closed by means of rings on the rotor. The cylinder chambers vary in sizes when the rotor rotates and reciprocates thereby the stoker of suction, compression, ignition and exhaustion takes place in the cylinder chambers.

The apparatus of this is relatively simple in construction and operation whereby the engine can be produced at relatively low cost. Fewer parts are required in its construction when compared with conventional engines. This new engine design should improve the efficiency of the engine operation and are extremely desirable.

SUMMARY OF THE INVENTION

The object of the present invention is to produce an improved internal combustion engine which is of the rotary-reciprocal type. Another object is to provide a novel apparatus which is a rotary-reciprocal internal combustion engine which also has chambers for compressing a gas and/or pumping fluid. Another object is to produce an apparatus which may be utilized as a two cycle rotary-reciprocal internal combustion engine or as a four cycle rotary-reciprocal internal combustion engine. Another object is to produce an apparatus which has the strokes of suction, compression, ignition and exhaustion. Still another object is to produce multiple arrangement of the rotary-reciprocal internal combustion engine of this invention. Another object is to produce an apparatus which may be utilized as a compressor, as a pump, and as an engine powered by the expansion of heated gases or liquids.

The two cycle and four cycle rotary-reciprocal internal combustion engine of this invention consist of:

1. A housing, a stationary hollow cylindrical housing having a circular cavity which is divided into 3 cavities, a laterally and peripherally placed cylinder chamber which is formed with walls consisting of the inner surface of the peripheral housing wall, the partial inner circular wall which is attached to one side wall of the housing and extends parallel with the peripheral wall of the housing toward the center of the housing, leaving room in the housing for the rotor to rotate and reciprocate, and the inner surface of the side wall (front) of the housing, this side wall has equally spaced arcuate recesses projecting into the cylinder chamber. The housing has passage ways for admitting a gaseous mixture to the cylinder chamber and passage ways for discharging combustion gases from the cylinder chamber. Compression chambers are formed in the posterior and anterior central area of the housing. These chambers are separated from each other by means of the rotor and closed by rings on the rotor. There are one or more spark plug ports in arcuate recess of the housing and open into the cylinder chambers.

2. A rotor, consisting of laterally and peripheral located circular piston with thick peripheral wall and a hollow center, the piston's side wall (front) has equally spaced waves which matches, in shape and number, the arcuate recesses in the cylinder chamber side wall (front) and are at 90° to the peripheral wall of the rotor's piston, rotor's posterior side wall and rotor's hub which is centrally located on the rotor's position wall and extends forward parallel with the rotor's peripheral wall and the hub has an unround (square, triangular, hexagon, etc.) opening for the engine shaft. The rotor for two cycle engines has an open passage way from the compression chamber thru the rotor's piston and communicates with the cylinder chamber. The rotor's piston has rings around the peripheral wall and inner circular wall which closes housing chambers. The cylinder chambers are further divided to form 2 or more cylinder chambers by means of seals which are located on the crest of the waved piston side wall (front) to form chambers for intake, compression, ignition and exhaustion. The rotor is rotariable and reciprocately mounted in the housing on an engine shaft. Counter balance weights may be added to the posterior wall of the rotor especially when only one spark plug is fired thereby giving an uneven pressure on the rotor.

3. An engine shaft, consisting of a central unround portion (square, hexagon, triangular, etc.) and two round ends which is mounted in the center of the circular housing cavity, passing thru the hub of the rotor and extending out the side walls of the housing. The engine shaft has means for the rotor to reciprocated on the engine shaft while rotating with the rotor and has means for pulleys, gears, other engines, etc. to attach to the round portion of the engine shaft.

4. A rotary-reciprocal guide, consisting of a stationary bearing attached to the housing and a waved rotary-reciprocal guide groove located on the peripheral surface of the rotor. The waved side walls of the groove matches, in number and shape, the waved piston's side wall and the arcuate recesses of the cylinder chamber side wall. The rotary-reciprocal guide guides the rotor in the housing while keeping the rotors rings and seals in continuous contact with the cylinder chamber's walls and varying the volume of the cylinder chamber enabling a compression of a gaseous mixture to take place after admitting a gaseous mixture to the cylinder chamber.

5. An ignition system, consisting of means for ignition of compressed gaseous mixture for expansion of cylinder chambers due to pressure on the rotor's piston from the combustion products.

The basic engine components of the engine of this invention may be used in a two cycle or a four cycle engine or in a double two cycle or four cycle engine. The two cycle engine's intake and exhaust ports are located in a position where the expanded combustion gases escape when the cylinder chamber has expanded to its maximum whereas in a four cycle engine the intake and exhaust ports are located in the area where cylinder chamber is the smallest so the fuel-air mixture can be drawn in when the cylinder chamber expands and the expanded combustion gases can be pushed out as the cylinder chamber becomes smaller. The two cycle engine may have one cylinder chamber or the cylinder chamber may be divided into two or more chambers by means of adding equally spaced and an equal number of waves to piston wall and equally spaced, equal shape and equal numbers of arcuate recesses to housing and adding seals to the crest of each wave on the rotor. Each chamber is furnished with an intake port, exhaust port and ignition means. The four cycle engine requires that the cylinder chamber be divided into two or more chambers wherein one of the chambers is for ignition of compressed fuel-air mixture and the other chamber is for exhaustion of exhaust gases. When the compressed fuel-air mixture is ignited and this one chamber expands by the heated gas pressure the other chamber draws in a fuel-air mixture by it being expanded. In a four cycle engine every other chamber has an ignition system.

A double rotary-reciprocal internal combustion of the two cycle or four cycle type is produced by attaching together the rotor of one engine with the rotor of another engine and mounting the rotors on one engine shaft then mounting the attached rotors into the two engine housing back to back and attaching them together. One rotor is mounted to where the waves of the rotor fits into the arcuate recesses in the housing on one side and on the other side the crest of the waves are mounted where they are opposite to the maximum recessed area of the arcuate recesses of the housing. When a double two cycle engine is to be made two cycle engines are utilized. When a double four cycle engine is to be made two four cycle engines are utilized. The double rotor may be made as a single rotor with double piston areas and only one rotary-reciprocal guiding system. The double rotary-reciprocal engine may be attached to another double rotary-reciprocal engine by attaching the two engine shafts together to form a quadruple rotary-reciprocal engine.

The cylinder chamber may be divided into more than two cylinder chambers. More than one of the cylinder chambers may have a spark plug or spark plugs which are fired at the same time. In two cycle rotary-reciprocal engine each cylinder chamber is furnished with a spark plug and is fired simultaneously. When there is one or two two cylinder chambers in this two cycle engine there is one ignition every 180° of rotation. When there are two cylinder chambers in the four cycle rotary-reciprocal engine there is a spark plug for every other cylinder chamber and there is one ignition every 180° of rotation. When there are 3 cylinder chambers in the two cycle rotary-reciprocal engine there are 3 spark plugs that fire simultaneously and there is an ignition every 120° of rotation. In a 3 cylinder chambers four cycle engine there is one spark plug. The spark plug is fired twice per 360° of rotation and one of the cylinder chambers are utilized to compress the gaseous mixture for the second time. In a 2 cycle, 4 cylinder chambers, rotary-reciprocal engine there is a spark plug for each cylinder chamber and they fire simultaneously every 90° of rotation. In a 4 cycle, 4 cylinder chambers, rotary-reciprocal engine there is a spark plug for every other cylinder and they fire simultaneously every 90° of rotation. In a 6 cylinder chambers, rotary-reciprocal engine there is an ignition every 60° of rotation. Odd numbers of cylinder chambers may be utilized in 2 cycle rotary-reciprocal engines.

The compression ratio and the reciprocal stroke is controlled by the design of the waved sides of the rotor guide which also dictates the design of the arcuate recesses in the cylinder chamber side wall and the rotor's piston waved side wall because the three must have the same pattern in order for the piston seals to continuously engage the inner surface of the cylinder chamber walls. The compression ratio and the reciprocal stroke may be designed as desired.

A pattern for the design of the waved and arcuate recessed surfaces is made by measuring the conference of the peripheral surface of the rotor of the desired diameter then measure that distance in a straight line on a pattern. Divide that line into equal parts equal to the amount of cylinder chambers desired, these points are the trough of the wave. Then find the center between each trough and that is the point where the crest of the wave will be then measure from this point out at 90° the amount of desired reciprocal stroke and that point is the crest of the wave where the seals are located. Now draw a curved line connecting the trough points with the crest points thereby producing the pattern for the waves of the rotor's piston and arcuate recesses of the housing.

The fuel systems for this rotary-reciprocal engine may be selected from a fuel pump-carburetor system, direct injection system or an air-assisted fuel system or any other desirable means. In a 2 cycle rotary-reciprocal engine the gaseous mixture may enter into a compression chamber which communicates with the cylinder chamber or only compressed air enters into the cylinder chambers from the compression chamber and the fuel is directly injected or air-assisted injected into the cylinder chambers. In a 4 cycle engine of this invention the gaseous mixture aspirated from a carburetor into the cylinder chambers or the air may be aspirated in and the fuel directly injected or air-assisted injected into the cylinder chambers utilizing compressed air from the compression chamber. Any suitable fuel may be utilized in the engines of this invention, suitable fuels include but are not limited to organic gases, liquid and powders such as petroleum fuel, e.g. gasoline, other petroleum distillates, organic gases e.g. methane ethane, propane, butane carbide, etc. alcohols, e.g. methanol, ethanol, propanol, etc., hydrogen, coal powder mixed with flammable gases or liquids. Gasoline is the preferred fuel.

The ignition system for this rotary-reciprocal engine may consist of any suitable method to ignite the fuel in the combustion cylinder chambers by means of an electrical spark or heat. The preferred ignition system is that commonly utilized in automobiles consisting of a storage battery, generator or alternator, and a timing device such as a distributor or an electronic timing device which are connected by wires to the spark plugs.

The cooling system of this rotary-reciprocal engine may be cooled by means of a liquid cooling system, by an air cooling system or by a combination of these two systems. In the liquid cooling system the coolant is pumped into chambers around the walls of the cylinder chambers then to a radiator for cooling than back to the engine. Cooling fins may be made into the walls of the cylinder chambers and cooled by air. Air also it utilized from the compression chambers to cool the inside of the rotor's piston and this heated compressed air may be utilized in the gaseous mixture which communicates with the cylinder chambers.

The rotor may have a counter balance weight added to the rotor or attached to the engine shaft. In engines with more than two spark plugs which are opposite to each other the ignition force is counter balanced by when only one spark plug is used as in a 4 cycle, 2 cylinder chamber, engine, a counter balance weight is useful.

DESCRIPTION OF THE DRAWINGS

Other objects of the invention will become apparent upon reading the annexed detail description in connection with the drawing in which:

FIG. 1 is a front view of a 2 cycle, 1 cylinder chamber, engine.

FIG. 2 is a front view of a 4 cycle, 2 cylinder chambers, engine.

FIG. 9 is a plan view of a 2 cycle, 1 cylinder chamber rotor.

FIG. 10 is a sectional view of a 4 cycle, 1 cylinder chamber rotor.

FIG. 12 is a frontal view of a 2 cycle, 1 cylinder chamber rotor.

FIG. 13 is a plan view of a 2 cycle, 2 cylinder chambers rotor.

FIG. 16 is a rear or inside view of the water jackket of a 2 for 4 cycle, 1 or 2 cylinder chamber, engine.

FIG. 19 is a side view of the engine shaft.

FIG. 20 is an end view of the engine shaft.

FIG. 21 is a sectional view of the housing of a 4 cycle, 2 cylinder chamber, engine.

FIG. 22 is a frontal view of the double rotor in the form of a single unit with two pistons and with one rotary-reciprocal guide groove.

FIG. 23 is a plan view of the double rotor in the form of a single unit with two piston areas and with one rotary-reciprocal guide groove.

FIG. 26 is a plan view of the rotor of a 4 cycle, 3 cylinder chambers, engine.

FIG. 27 is a sectional view of the rotor of a 4 cycle, 3 cylinder chambers, engine, taken along lines similar to 27—27 of FIG. 1.

FIG. 29 is a posterior inside view of the engine housing of a 2 cycle, 4 cylinder chambers, engine of FIG. 3.

FIG. 32 is a plan view of a rotor of a 4 cycle, 4 cylinder chambers, engine alone lines 32—32 of FIG. 3.

FIG. 35 is a plan view of a rotor of a 4 cycle, 6 cylinder chambers, engine of FIG. 4.

FIG. 36 is a sectional view of a rotor of a 4 cycle, 6 cylinder chambers, engine of FIG. 4.

FIG. 37 is a frontal view of the engine housing of a 4 cycle, 6 cylinder chambers, engine of FIG. 4.

FIG. 38 is a plan view of the water jacket of a 4 cycle, 6 cylinder chambers, engine of FIG. 4.

FIG. 48 is a frontal view of an air cooled engine housing of a 2 cycle, 2 cylinder chamber, engine.

FIG. 49 is a sectional view of an air cooled engine housing of a 2 cycle, 2 cylinder chambers, engine of FIG. 48.

FIG. 50 is a plan view of an air cooled engine housing of a 4 cycle, 2 cylinder chambers, engine.

FIG. 51 is a plan view of an air cooled engine housing of a 4 cycle, 4 cylinder chambers, engine.

FIG. 52 is a plan view of an air cooled engine housing of a 4 cycle, 6 cylinder chambers, engine.

DESCRIPTION OF PREFERRED EMBODIMENT

Figure 5:
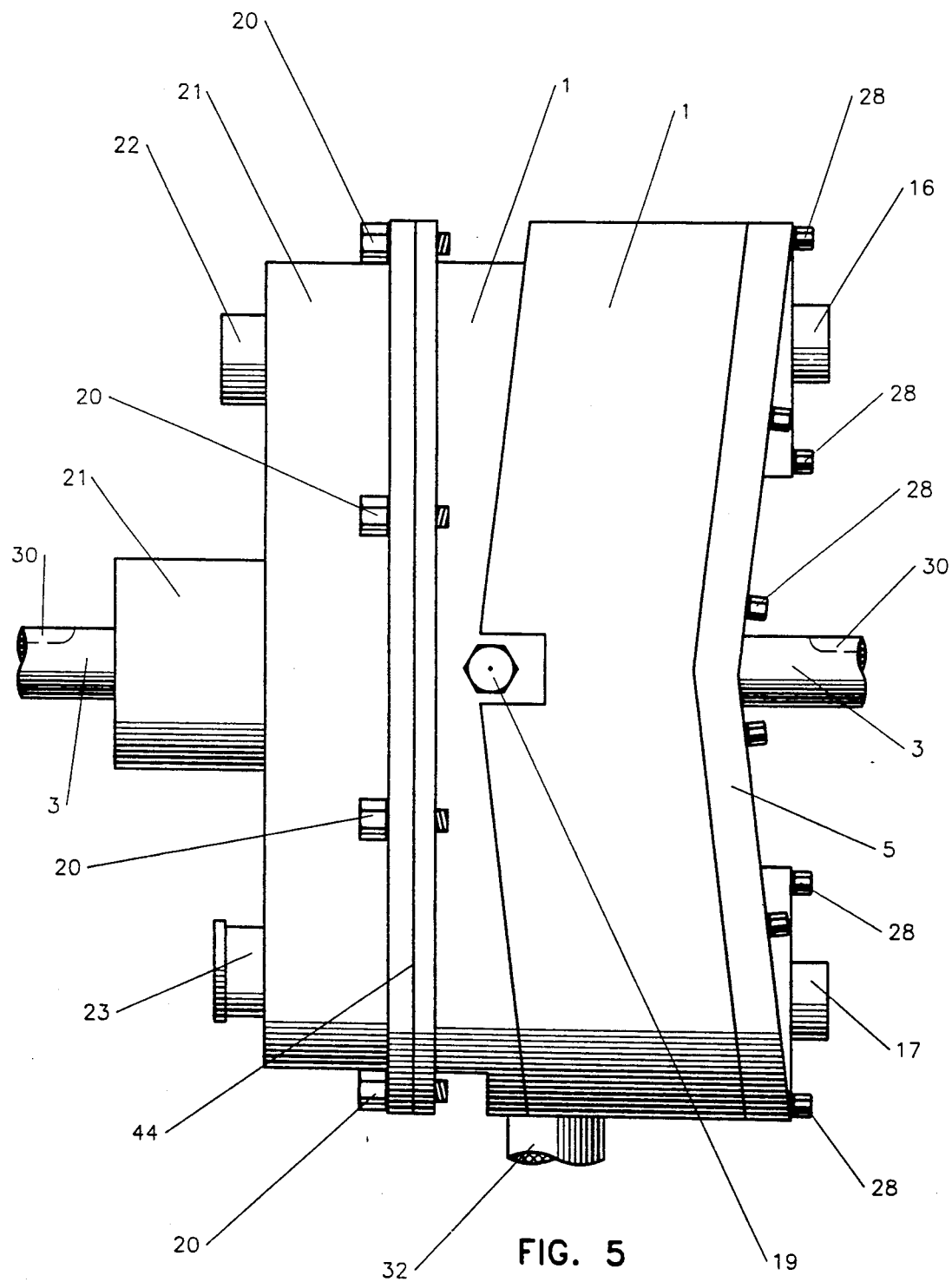
FIG. 5 is a plan view of the housing of a 2 cycle, 1 cylinder chamber engine.

Referring to the drawings and in particular to FIG. 1 and FIG. 5 the rotary-reciprocal engine of the present invention includes an engine housing 1 which has a water jacket 5 attached to the front of the engine housing by bolts 28, a posterior housing 21 for posterior compression chamber 6 is attached to the posterior of the engine housing by bolts 20. An attachment 19 goes thru the housing and holds the rotary-reciprocal guide bearing 46 in place. The round portion of the engine shaft 3 extends out thru the center of the housing and has a groove 30 for a pin. The engine housing 1 of the two cycle engine has exhaust ports 32 in the peripheral posterior area of the housing. A combustible fuel, oil and air mixture is taken thru an intake port 22 into the posterior compression chamber 6 by suction and the posterior compression has an outlet port 23 when needed. The water jacket 5 has an intake port 16 for a coolant and an outlet port 17 for the coolant which is circulated thru a radiator then back thru inlet port 16 by means of a pump. The housing's cylinder chamber 35 is surrounded by passage way 49 for a liquid coolant. The front of the engine housing has two spark plug ports 33, an intake port 53 to the anterior compression chamber 51 suctioning in air and/or air-fuel mixture and an outlet port 54.

Figure 6:
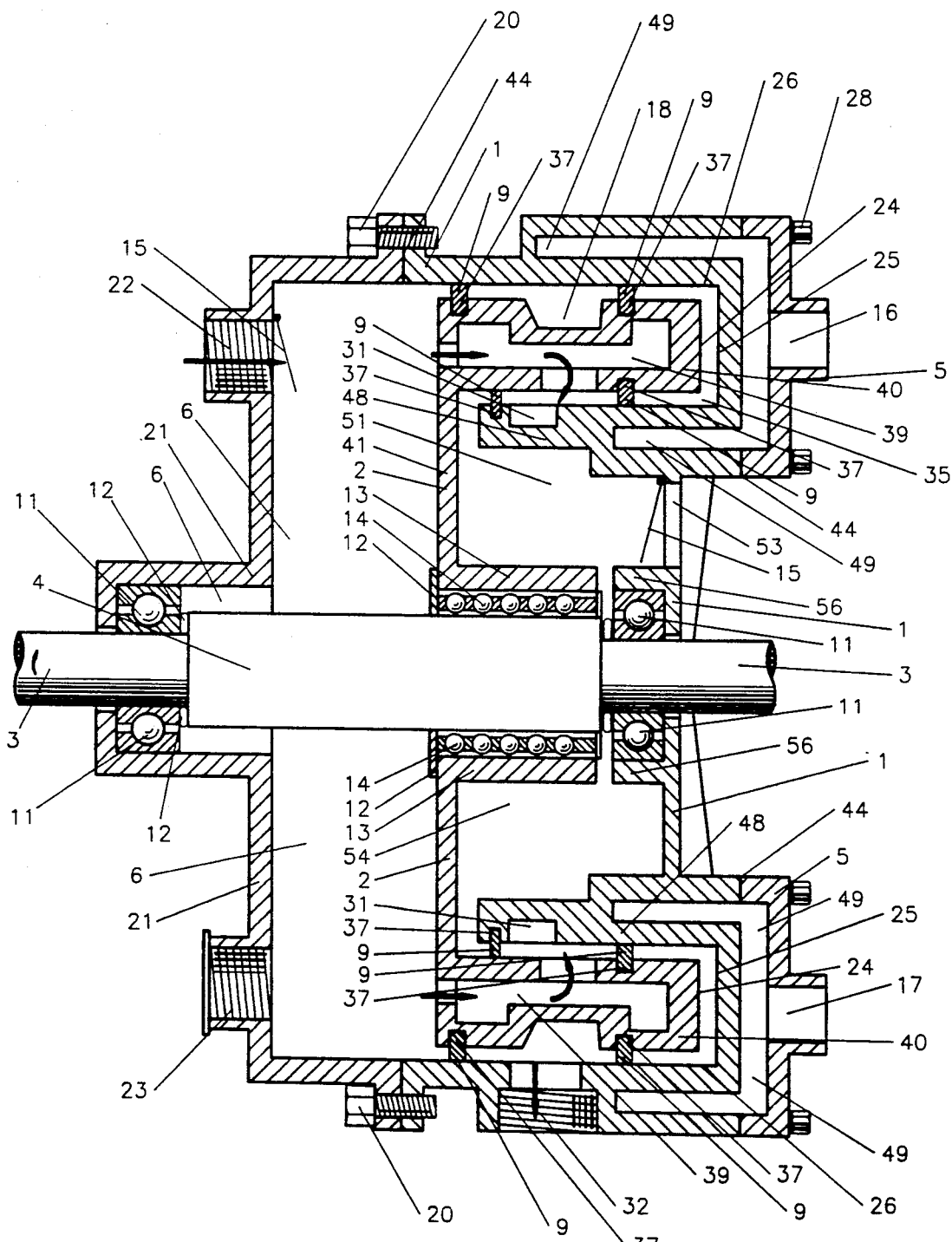
FIG. 6 is a sectional view of FIG. 1 and FIG. 5 taken along lines 6—6 of FIG. 1.

Referring to FIG. 6 a sectional view of a 2 cycle, 1 cylinder chamber, engine consist of a fixed engine housing 1 having a cylindrical cavity which is divided into lateral and peripheral located cylinder chamber 35, an anterior compresssion chamber 51 which is located in frontal central area and a posterior compression chamber 6. The cylinder chamber 35 is formed by the frontal lateral peripheral wall, the arcuate recessed front side wall 25 and the partial circular inner wall 48.

The rotor 2 is rotarably and reciprocally mounted in the housing cavity on a centrally located engine shaft 4. The rotor 2 is cylindrical shaped with a thick peripheral piston 40 area which has equally spaced waved surface 24 on the front peripheral side wall which are at 90° to the peripheral wall of the rotor, with the central area being open in front and the posterior rotor wall 41 which is at 90° to peripheral wall of the piston is closed and has a hub 13 in the central area which protrudes laterally at 90° and which fits over the unround (square) portion of the shaft 4. The rotor 2 reciprocates on the engine shaft 4 by means of a bearing 14 which may be a roller type bearing or a metal oil bearing. The engine shaft 3 is mounted on bearings 11 on the side walls 56, front and posterior, and rotates with the rotor 2. The rotor's piston 40 has rings 9 which close off the cylinder chamber 35 from the central 51 and posterior 6 compression chambers and the rotor's piston 40 fits into the cylinder chamber 35. The rotor 2 has a rotor and reciprocal guide 18 on the peripheral surface of the rotor and its walls are equally spaced waves which are the same shape and number as the waved shape rotor surface 24 and the arcuate recesses 25 in the engine housing's front peripheral wall. The center of the piston 40 portion of the rotor has a passage way 39 from the posterior compression chamber 6 thru the inner piston wall and communicates with the cylinder chamber 35 when the rotor's piston 40 reciprocates posteriorly and the cylinder chamber 35 is expanded to its maximum and the fuel-gaseous mixture passes into the cylinder chamber 35 while the exhaust gases pass out the exhaust port 32 on the peripheral wall of the engine housing 1. The central front wall has an inlet 53 for air, fluid or fuel-air mixture and has a one way valve 15 such as a Reed valve going into the central compression chamber 51 also there is an outlet passage 54 from the central compression chamber and may or may not be opened depending if the chamber is used as a compressor.

Figure 11:
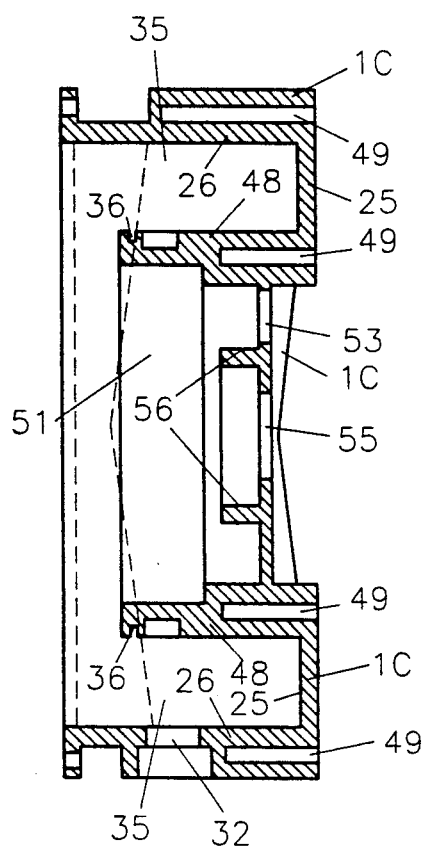
FIG. 11 is a sectional view of a 2 cycle, 1 or 2 cylinder chamber, engine housing.
Figures 14, 15:
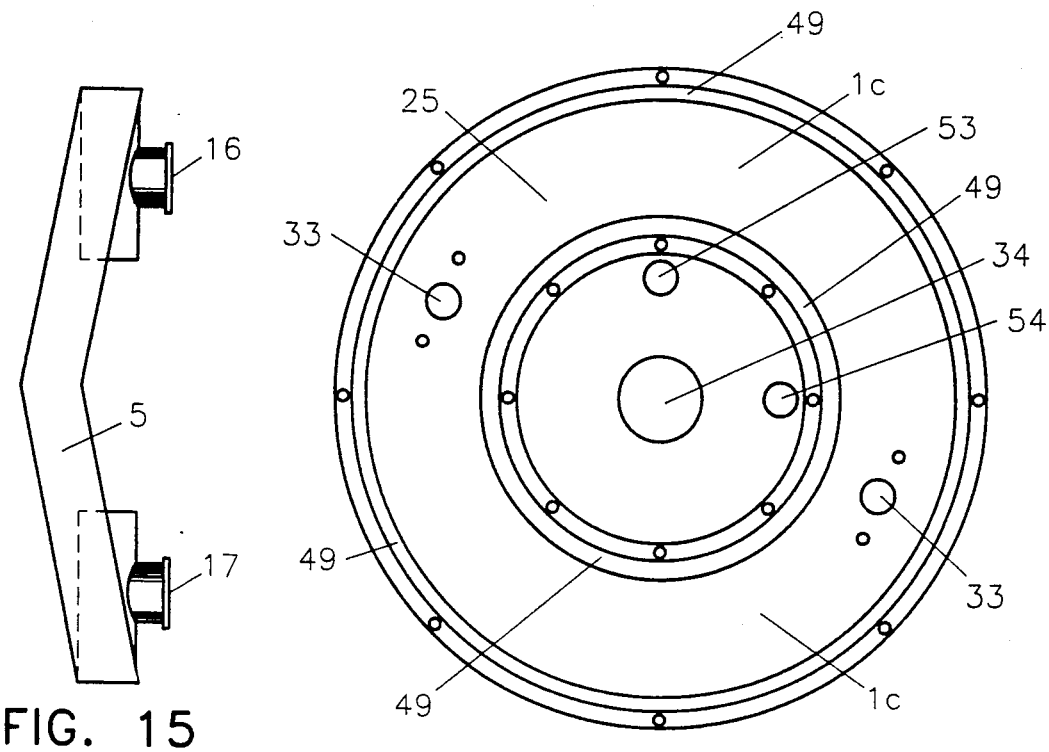
FIG. 14 is a front view of the housing of a 2 cycle, 1 or 2 cylinder chambers, engine.
FIG. 15 is a plan view of a water jacket of a 2 for 4 cycle, 1 or 2 cylinder chambers, engine.

Referring to FIGS. 11, 13 and 14 wherein FIG. 11 shows a housing 1c for a 2 cycle, 2 chambers, engine, FIG. 13 shows a rotor 2b for a 2 cycle, 2 cylinder chambers, engine and FIG. 14 shows a frontal view of the housing of a 2 cycle, 2 cylinder chambers, engine, the rotary-reciprocal 2 cycle, 1 cylinder chamber engine of FIGS. 1, 5 and 6 has the same parts and is essentially the same as the rotary-reciprocal 2 cycle, 2 cylinder chambers, engine except that it has two exhaust ports and the rotor has seals 7, 8 on the crest of the two waves on the rotor's piston 24.

Figure 7:
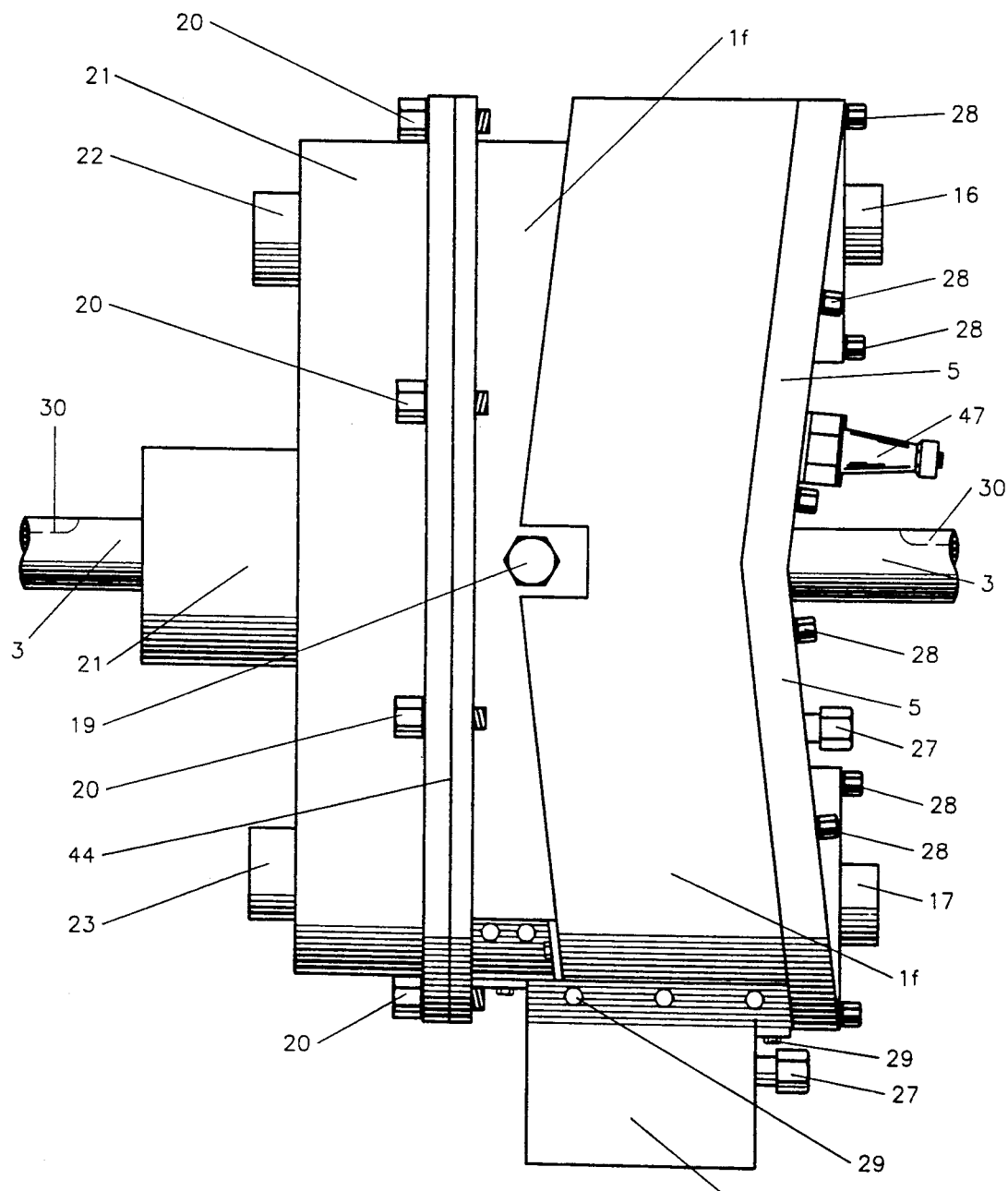
FIG. 7 is a plan view of the housing of a 4 cycle, 2 cylinder chamber engine.
Figure 8:
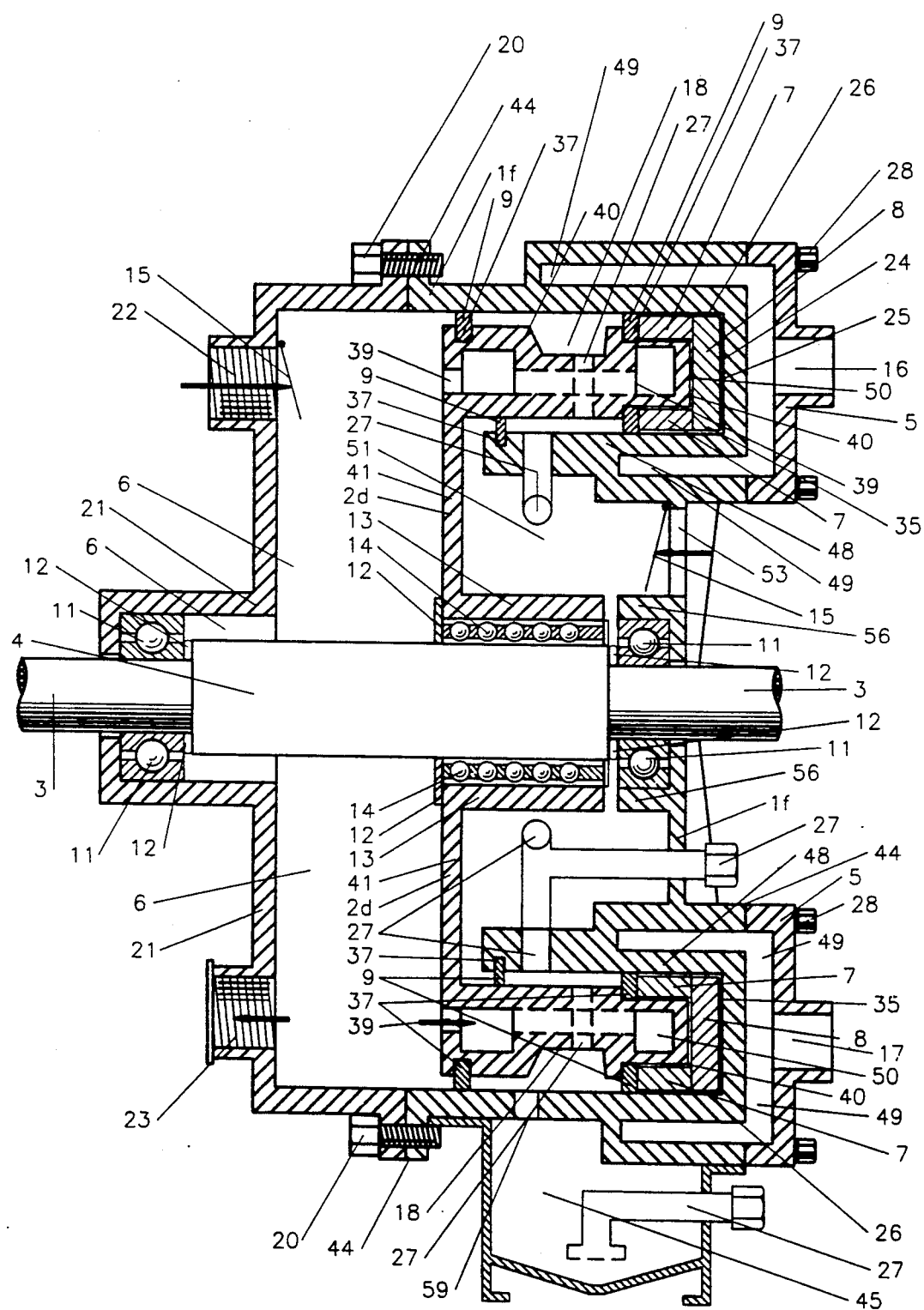
FIG. 8 is a sectional view of FIG. 7 and FIG. 2 taken along lines 8—8 of FIG. 2.
Figures 33, 47:
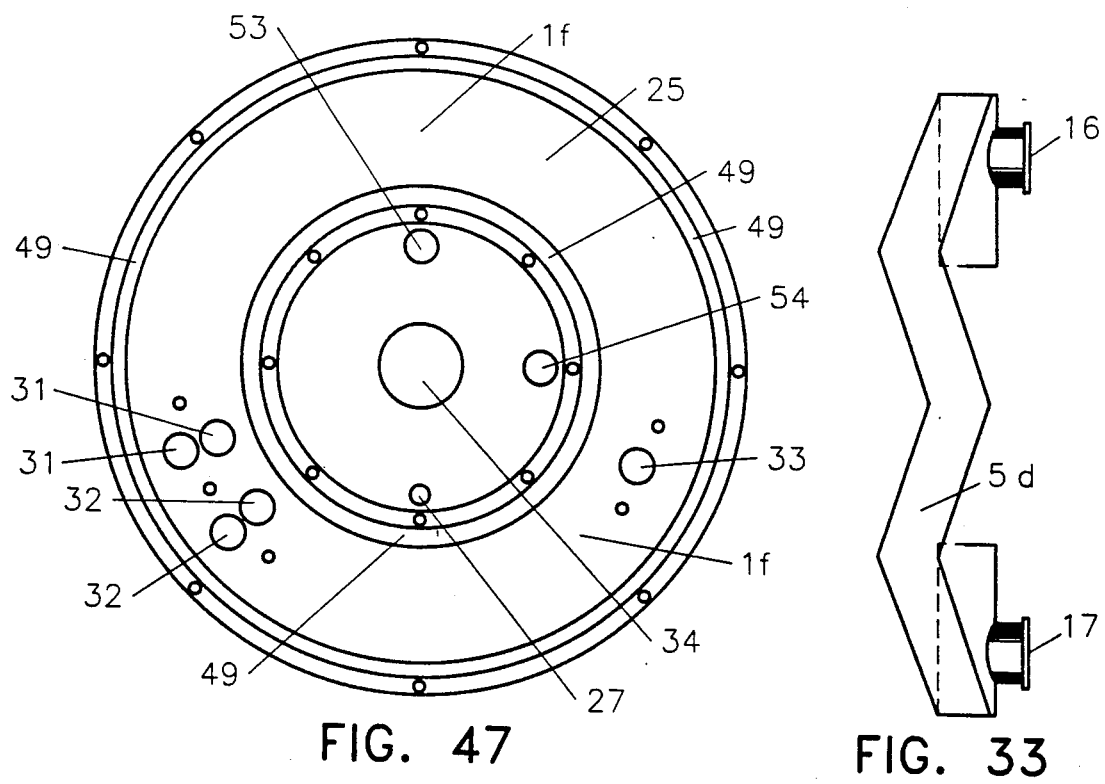
FIG. 33 is a plan of the water jacket of a 4 cycle, 4 cylinder chambers, engine of FIG. 3.
FIG. 47 is a frontal view of engine housing of a 4 cycle, 2 cylinder chamber, engine of FIG. 2.

Referring to FIG. 2, 7 and 8 wherein drawings of a 4 cycle, 2 cylinders chamber, engine is drawn shows that the housing 1b, rotor 2b and engine shaft 3, 4 are essentially the same as a 2 cycle, 2 cylinder chambers, engine except that the exhaust port is in the front wall of one of the cylinder chambers and the intake port is also in the front wall of the one of the cylinder chambers and there is only one spark plug 47. FIG. 2 is a frontal view of a 4 cycle, 2 chambers, engine consisting of a fixed housing 1f, a water jacket 5b, engine shaft 3, and an oil pan 24 with an oil outlet 27. The water jacket 5 has a coolant inlet 16 and a coolant outlet 17 and is attached to the engine housing 1f by bolts 28. The engine housing 1f has a 1 way inlet 53 and an outlet 54 communicating with the central compression chamber 51. The housing 1f has an exhaust port 32 and an intake port 31 and a spark plug port 33 communicating with the cylinder chambers. FIG. 7 is a plan (side) view of a 4 cycle, 2 cylinder chambers, engine consisting of a fixed engine housing 1f with an attachment 19 to hold the rotary-reciprocal guide bearing 46, spark plug 47 for ignition, oil line 27 for lubricating rotor; a posterior housing 21 for posterior compression chamber 6, which has a 1 way intake port 22 and an outlet port 23 and is attached to the engine by bolts 20; an oil pan 24 with an oil line 27 and is attached to the engine housing 16 by means of bolts 29; and the round portion of the engine shaft 3 extending thru the front and posterior housing. FIG. 8 is a sectional view along lines 8—8 of FIG. 2, of the 4 cycle, 2 cylinder chambers, rotary-reciprocal engine of this invention consisting of a fixed engine housing 1f which has a water jacket 5 attached to it in front by bolts 28 and the water jacket has coolant passages 49 around the cylinder chambers 35 walls, then posteriorly there is a posterior housing 21 which is attached to the engine housing 1f by bolts 20 and at the bottom of the housing is an attached oil pain 45 which is attached by bolts 29. The fixed engine housing 1f has a cylindrical cavity which is divided into a cylinder chamber 35, an anterior central compression chamber 51 and a posterior compression chamber 6. The cylinder chamber 35 is located in the lateral peripheral portion of the housing cavity and is formed by the inner peripheral wall 26, the peripheral portion of the front wall 25 which has two equally spaced arcuate recesses 25 at 90° to the peripheral wall and a partial inner wall 48 which is cylindrical in shape attached at 90° to the front arcuate recessed wall 25 and extends posteriorly but leaves room for the rotor to rotate and reciprocate and is below the peripheral wall 26; It forms the anterior central compression chamber 51 along with the front wall which also has a one way inlet 53 and an outlet 54. An oil line 27 attaches to the inner wall 53 and flows into a portion of the cylinder chamber 35 then flows thru a passage way 27, thru the rotor 2d to the peripheral wall 26 then back to the oil pan 45 thru an opening 57 in the exterior, inferior portion of the housing. A cylindrical shaped rotor 2d is rotatably and reciprocally mounted in the housing cavity on a centrally located engine shaft 4 which protrudes thru the housing's front and posterior walls. The rotor 2 has a thick peripheral wall 40 with the front open and the posterior area is closed with a wall 41 which is 90° C. to the rotor's peripheral wall and has a centrally located hub 13 which extends laterally at 90° to the posterior wall and has an unround central passage 42 thru the hub 13, the thick peripheral wall is the piston 40 portion of the rotor 2d and has 2 equally spaced waves 24 on the front wall which are 90° to the peripheral wall 26 of the rotor 2d and are shaped like the arcuate recesses 25 of the front of the inner cylinder chambers. On the peripheral surface of the rotor there is a rotary-reciprocal guide groove 18 around the rotor and its sides has 2 equally spaced waves 24 which are of the same shape as the arcuate recesses of the inner cylinder wall 25 and front rotor's piston 40 wall 24; the peripheral wall and inner wall of the rotor's piston 40 has ring grooves 36 and the 2 crest of the waves of the piston 40 has grooves for seals 38 on the peripheral, front and inner surfaces of piston 40 which closes the cylinder chambers 35 from central compression chamber 51 and posterior compression chamber 6 from each other when rings and seals are in place in the engine housing. The piston portion of the rotor 40 has air passage 39 which communicates with the posterior compression chamber 6 and assists in cooling the rotor 20. The hub 13 fits over the unround portion of the engine shaft 4 and the rotor reciprocates on the engine shaft 4 by means of a roller type bearing or a metal oil bearing. The engine shaft 3 is mounted on bearings 11 on the side walls, front and posterior, and rotates with the rotor 2d. FIG. 33 is a plan view of the water jacket 5d for a 4 cycle, 4 cylinder chambers, rotary-reciprocal engine and has a coolant inlet 16 and a coolant outlet 17. The 4 cycle, 4 cylinder chambers rotary-reciprocal engine is similar to the 4 cycle, 2 cylinder chambers, rotary-reciprocal engine of FIG. 2, 7 and 8 except that it has 4 cylinder chambers 35 and requires 2 exhaust ports, 2 intake ports and two spark plugs; the posterior housing 21 and engine housing 1f are the same. The 4 cycle, 4 chambers, rotary-reciprocal engine shown in detail as a double engine in FIG. 45 and 46.

Figure 24:
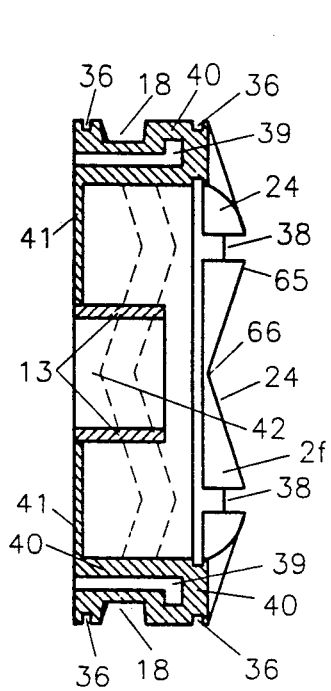
FIG. 24 is a sectional view of the rotor of a 4 cycle, 4 cylinder chambers, engine taken along lines 24—24 of FIG. 4.
Figure 3:
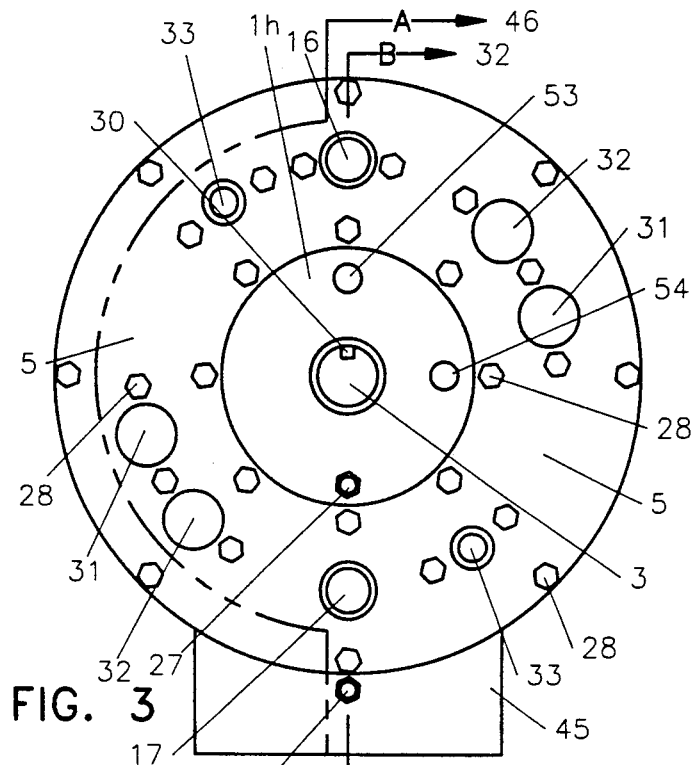
FIG. 3 is a front view of a 4 cycle, 4 cylinder chambers, engine.
Figure 30:
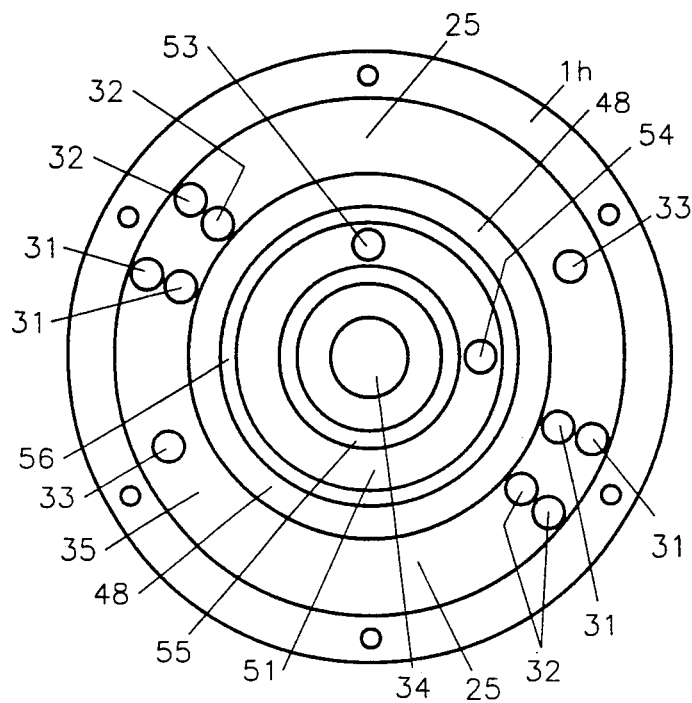
FIG. 30 is a posterior inside view of the engine housing of a 4 cycle, 4 cylinder chambers, engine of FIG. 3.
Figure 18:
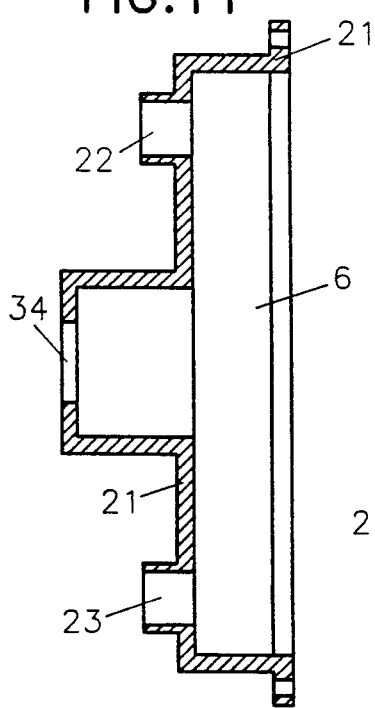
FIG. 18 is a sectional view of the housing over the posterior compression chamber of a 2 or 4 engine, taken along lines 18—18 of FIG. 1.
Figure 17:
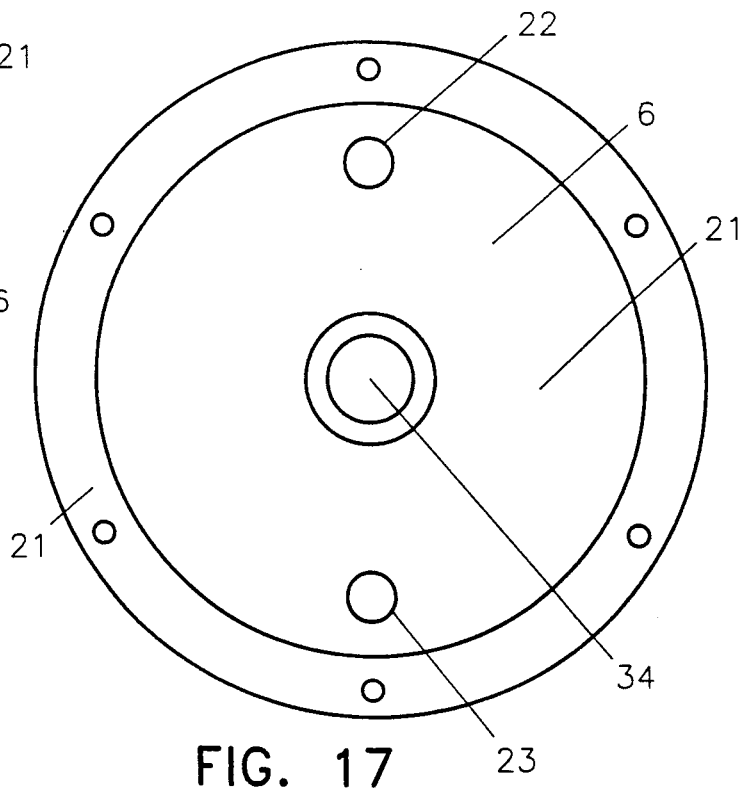
FIG. 17 is an inside view of the housing over the posterior compression chamber.
Figure 31:
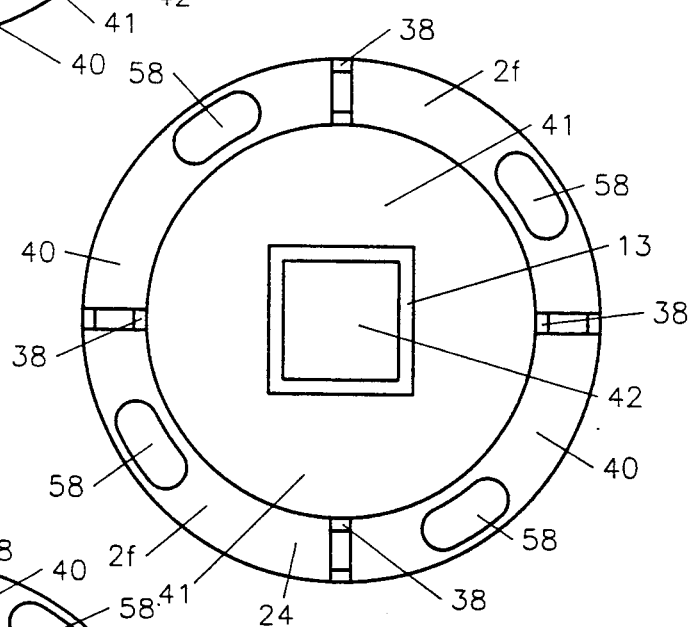
FIG. 31 is a frontal view of the rotor of a 4 cycle, 4 cylinder chambers, engine of FIG. 3.

Referring to FIG. 3, 24, 30, 31, 32 and 33 which are drawings of a 4 cycle, 4 cylinder chambers, rotary-reciprocal engine, wherein FIG. 3 is a drawing of the front of a 4 cycle, 4 cylinder chambers, rotary-reciprocal engine which includes an engine housing 1h, a water jacket 5, an oil pan 45 with an oil line 27 and an engine shaft 3 with a groove for a pin 30. The water jacket 5 has an inlet port 16 and an outlet port 17, and is attached to the engine housing by bolts 28. The engine housing has two spark plug ports 33 opposite each other, two exhaust ports 32 opposite each other and two inlet ports 31 opposite each other. The central front wall has a one way inlet 53 and an outlet 54. FIG. 24 is a sectional view of a rotor 2f for a 4 cycle, 4 cylinder chambers, rotary-reciprocal engine which has grooves for 4 sets of seals 7, 8 and 3 rings 9 on the rotor's piston and has an air passage way 39 to the center of the rotor's piston for air cooling of the piston. FIG. 30 is a posterior inside view of the engine housing of a 4 cycle, 4 cylinder chambers, rotary-reciprocal engine which includes cylinder chamber 35, central frontal compression chamber 51 peripheral wall 26, inner cylindrical wall 48, bearings wall 56, engine shaft orifice 34, central chamber inlet 53 and outlet 54, 2 spark plug holes 33; exhaust ports 32, inlet ports 31 for gas mixture and holes for bolt 20 to attach the posterior housing. FIG. 31 is a frontal view of a rotor, of a 4 cycle, 4 cylinder chambers, rotary-reciprocal engine which includes the grooves 38 for 4 sets of seals in the crest of the waved front wall 24, the square hub 13, the posterior rotor wall 41 the piston 40 portion of the rotor and the fuel collection cavities 58 and the waved portion of the rotor's piston 24. FIG. 32 is a plan (side) view of a rotor of a 4 cycle, 4 cylinder chambers, rotary-reciprocal engine.

Figure 4:
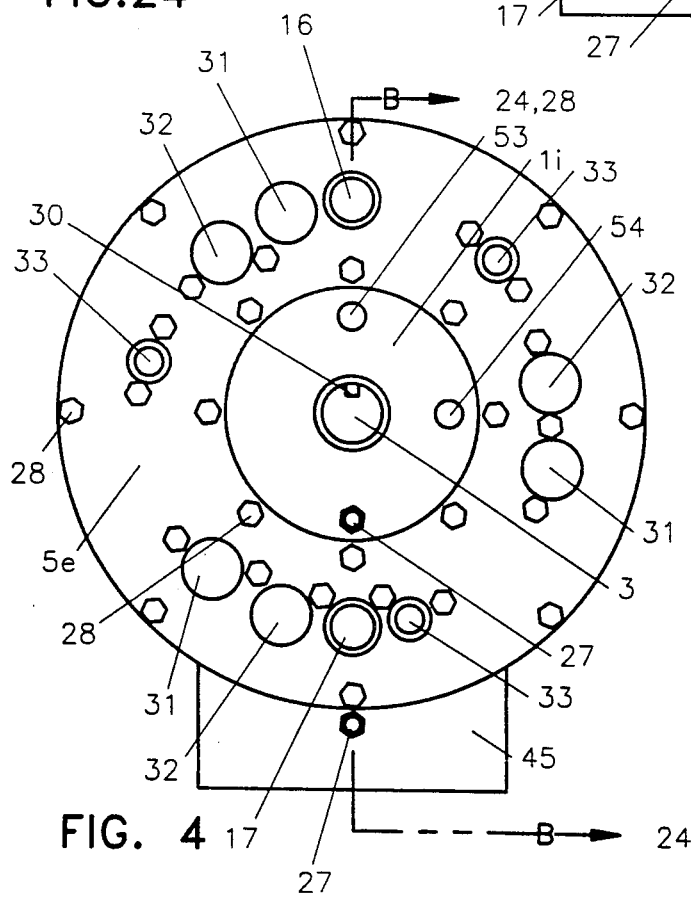
FIG. 4 is a front view of a 4 cycle, 6 cylinder chambers, engine.
Figure 28:
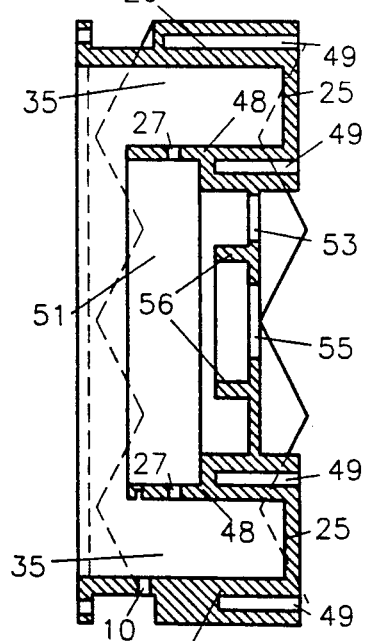
FIG. 28 is a sectional view of the engine housing of a 4 cycle, 6 cylinder chambers, engine, taken along lines 28—28 of FIG. 4.
Figure 34:
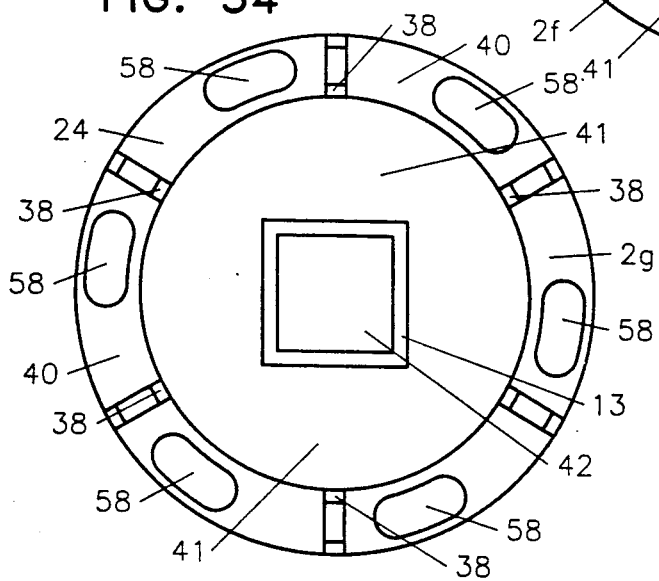
FIG. 34 is a frontal view of a rotor of a 4 cycle, 6 cylinder chambers, engine of FIG. 4.
Figure 45:
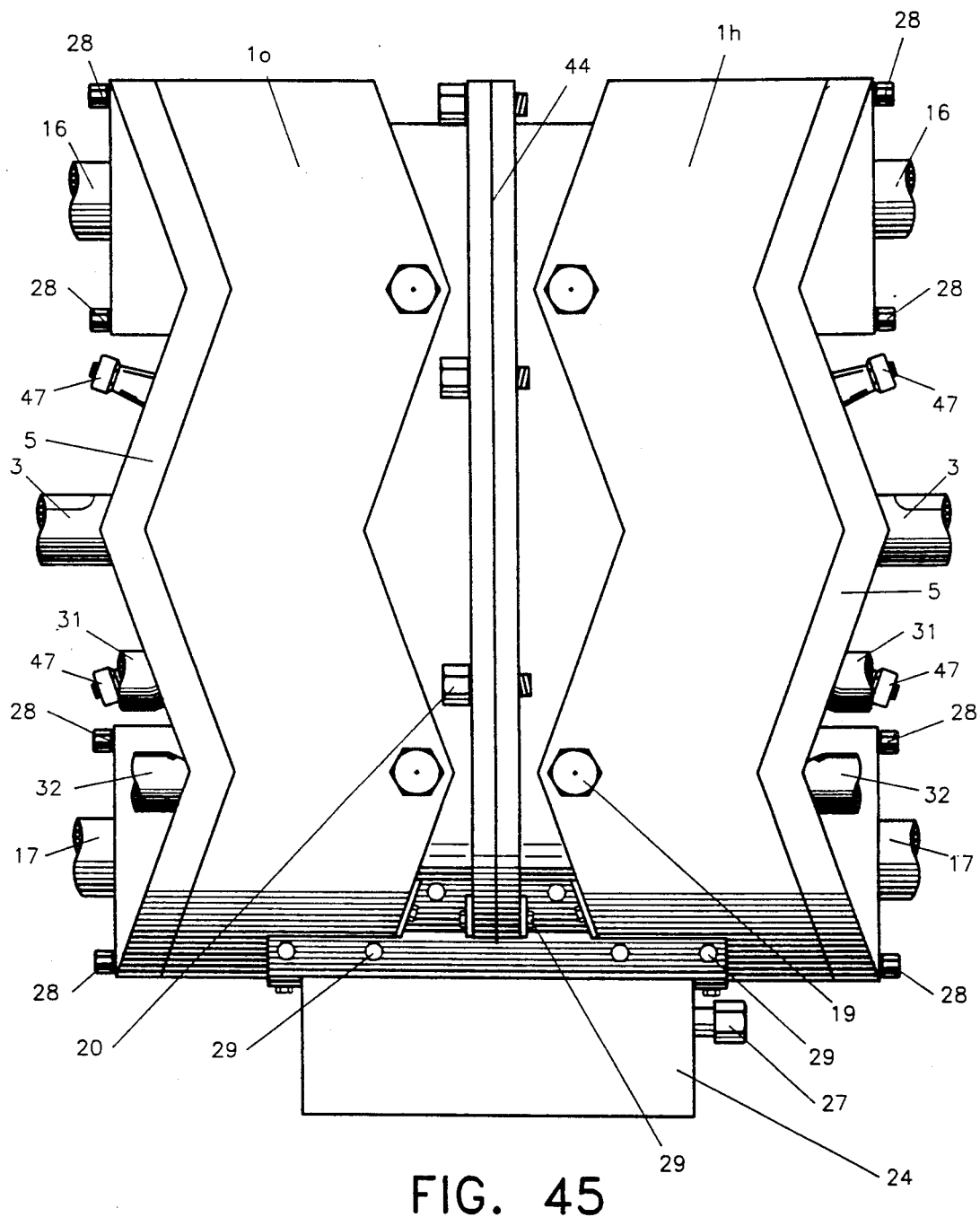
FIG. 45 is a plan view of a double, 4 cycle, 4 cylinder chambers, engine.

Referring to FIG. 4, 28, 34, 35, 36, 37 and 38 which are drawings of a 4 cycle, 6 cylinder chambers, rotary-reciprocal engine and FIG. 4 is a frontal view showing three spark plug orifices 33 which are equally spaced around the frontal cylinder chamber wall and the spark plug 47 fire at the same time giving a balance force on the rotor; there are 3 intake ports 31 and 3 exhaust ports 32; the oil pan 45 has an outlet line 27 which connects to an oil pump and the oil is pumped thru the engine thru the oil line 27, there is a water jacket 5e on the front of the engine which is bolted 28 to the engine housing 1i and has a coolant inlet 16 and a coolant outlet 17 for passage of coolant around the engine housing 1i. The round portion of engine shaft 3 extends out the center of the engine housing 1i and has a groove 30 for a pin 30 to attach gears, pulley, etc. to the engine shaft. FIG. 28 is a sectional of the engine housing 1i of FIG. 4 along 7—7 lines and attaches in front to the water jacket 5e and posteriorly to the posterior housing 21 which is the same used on both the 2 cycle and 4 cycle engines; the engine housing 1i of FIG. 28 includes a coolant passage way 49, a frontal wall 25 which has 6 arcuated recesses 25 which are equally spaced, a circular peripheral wall 26, an inner circular wall 48 and these 3 walls form the cylinder chamber 35 which is divided into 6 chambers by means of the rotor's rings 9 and seals 7, 8; A central compression chamber 51 is formed by the inner wall 48, front wall and rotor, it has a one way intake port 53 and an outlet port 54, a circular bearing support wall 13 is attached to front central wall and the front wall has a central round opening 55 for the round portion of the rotor 3; a posterior chamber is located behind the cylinder chamber and anterior central compression chamber and is separated by the rotor; the inner circular wall 48 has an orifice 27 for the passage of the oil into the cylinder chamber 35 and an orifice 57 for the oil to pass back into the oil pan. FIG. 37 is a frontal view of the housing of FIG. 4 and 28 which includes coolant passages 49, front wall with 6 equally spaced arcuate recesses 25 which contain 3 spark plug orifices 33 and these spark plugs fire simultaneously, 3 double exhaust ports 32, 3 double intake ports 31 and the central front wall has a one way intake air port 53 and outlet air port 54 to the central compression chamber and an orifice 55 for the engine shaft 3; the housing has threaded holes for bolting the water jacket 5e to the engine housing with bolts 28. FIG. 34, 35 and 36 are drawing of the rotor 2g for a 4 cycle, 6 cylinder chambers, rotary-reciprocal engine; FIG. 31 shows a side (plan) view of this rotor 2g which includes a grooves for 3 sets of rings 36 grooves for 6 sets of seals 38 and a rotor-reciprocal guide groove 18 in which the side walls of the groove has 6 equally spaced waves which match the equally spaced waves 24 on the front of the rotor's piston 40 and the equally spaced arcuate recesses 25 of the engine housing 1i; FIG. 34 is a front view of this rotor 2g consisting of 6 equally spaced seal grooves 38 and 6 equally spaced gaseous mixture collectors 58 on the front surface of the rotor's piston area 40; in the center of the posterior rotor wall 41 is a square hub 42 which is at 90° to the posterior rotor wall 4 and has an orifice 42 which fits over the square area of the engine shaft 4. FIG. 36 is a sectional of this rotor 2g of FIG. 4 which includes the additional air passage thru the rotor's piston 39, rotor's piston seal grooves 38 and ring grooves 9. A side view of FIG. 4 is shown in FIG. 45 as a double engine; FIG. 38 is a side view of the water jacket 5e of FIG. 4.

Figure 25:
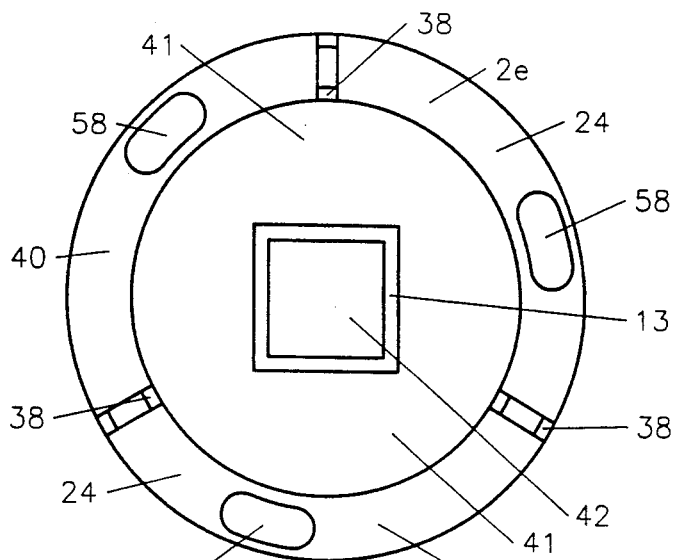
FIG. 25 is a front view of a rotor of a 4 cycle, 3 cylinder chamber, engine.

Referring to FIG. 25, 26 and 27 which are drawings of a 4 cycle, 3 cylinder chambers, rotary-reciprocal engine rotor, FIG. 25 is a frontal view of a rotor from a 4 cycle, 3 cylinder chambers, rotary-reciprocal engine which includes the 3 grooves for the seals 38, 3 gaseous collecting cavities 58, the piston portion 40 of the rotor 2e, the square hub 13 and the engine shaft orifice 42. FIG. 26 is a plan view of the rotor from a 4 cycle, 3 cylinder chambers, rotary-reciprocal engine which includes the 2 ring grooves 36 and 3 seal grooves 38 and a rotary-reciprocal guide groove 18 in which the waved side walls are waved like the waves on the front of the rotor's piston 24 and the arcuate recessed 25 front cylinder wall of a 3 cylinder chambers, engine. FIG. 27 is a sectional view of the rotor from a 4 cycle, 3 cylinder chambers, rotary-reciprocal engine which includes ring grooves 9, seals groove 38, rotary-reciprocal guide groove 18, rotor's hub 13 and engine shaft orifice 42. The engine housing has 3 cylinder chambers 35 otherwise is like the engine housing of a 4 cylinder, 2 cylinder chambers, engine of FIG. 2, 7 and 8 and the posterior housing 21 and the engine shaft 4, 3 are the same.

Figure 39:
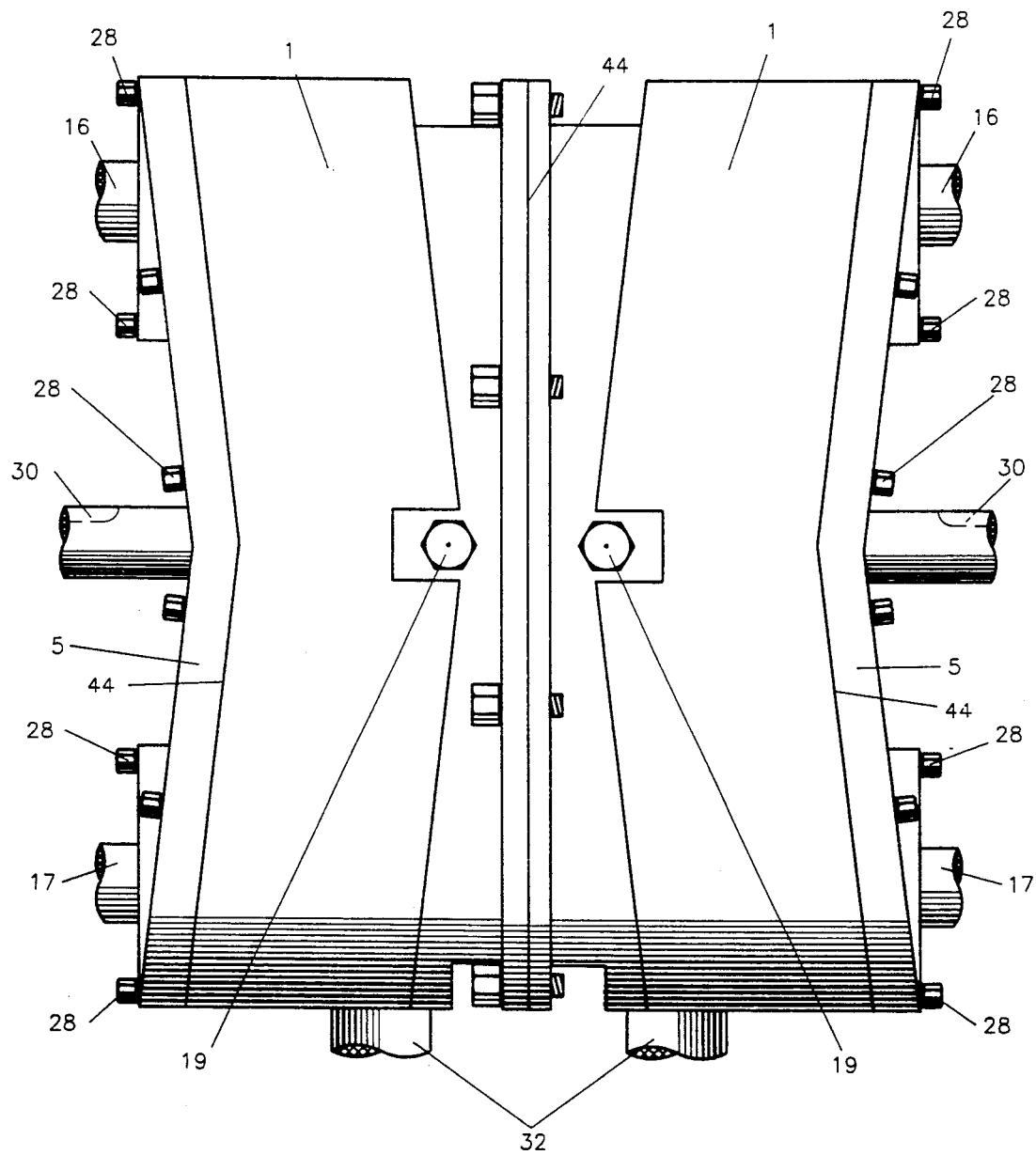
FIG. 39 is a plan view of a double, 2 cycle, 1 cylinder chamber, engine.
Figure 40:
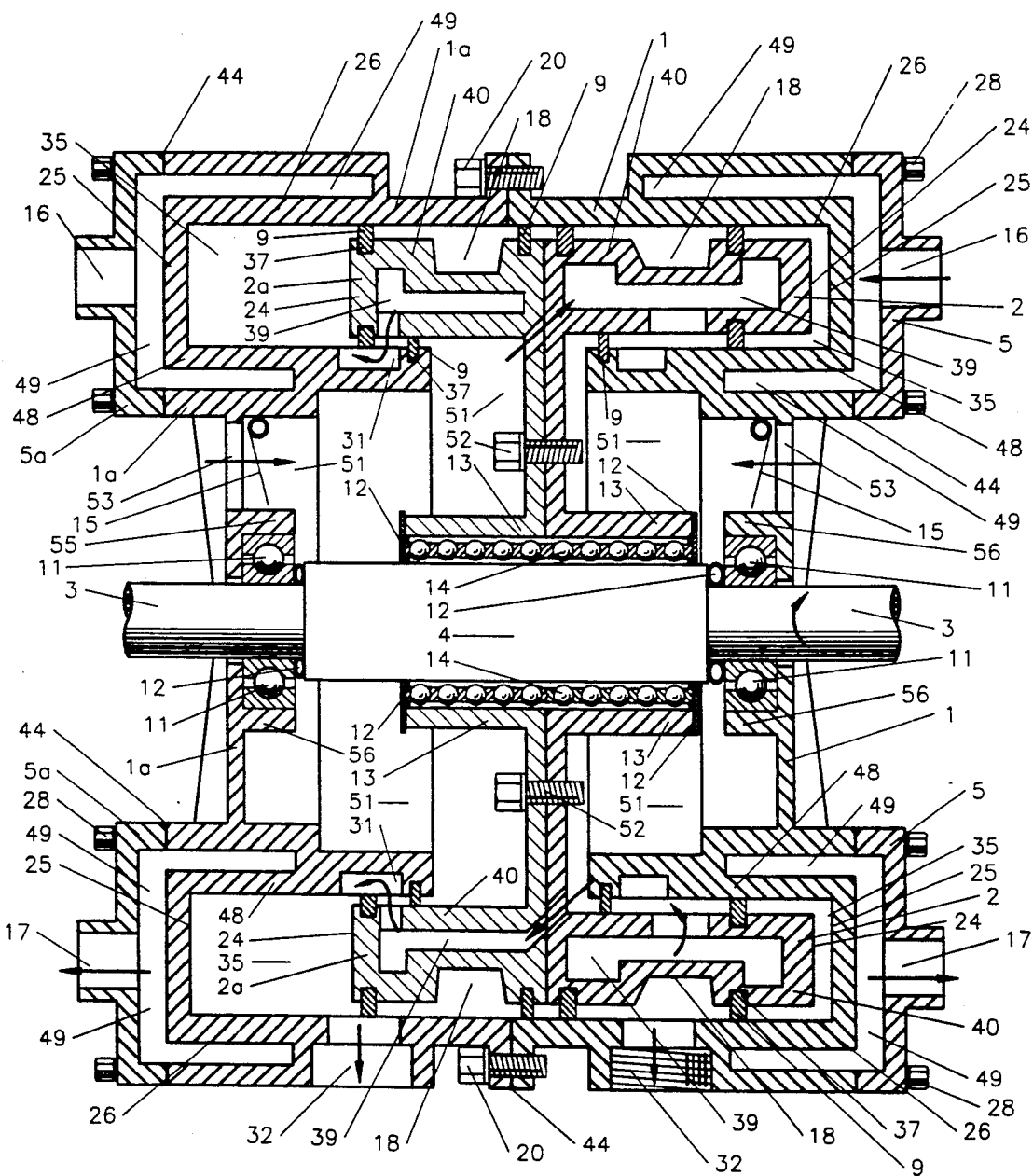
FIG. 40 is a sectional view of a double, 2 cycle, 1 cylinder chamber, engine alone lines 40—40 of FIG. 1.
Figure 41:
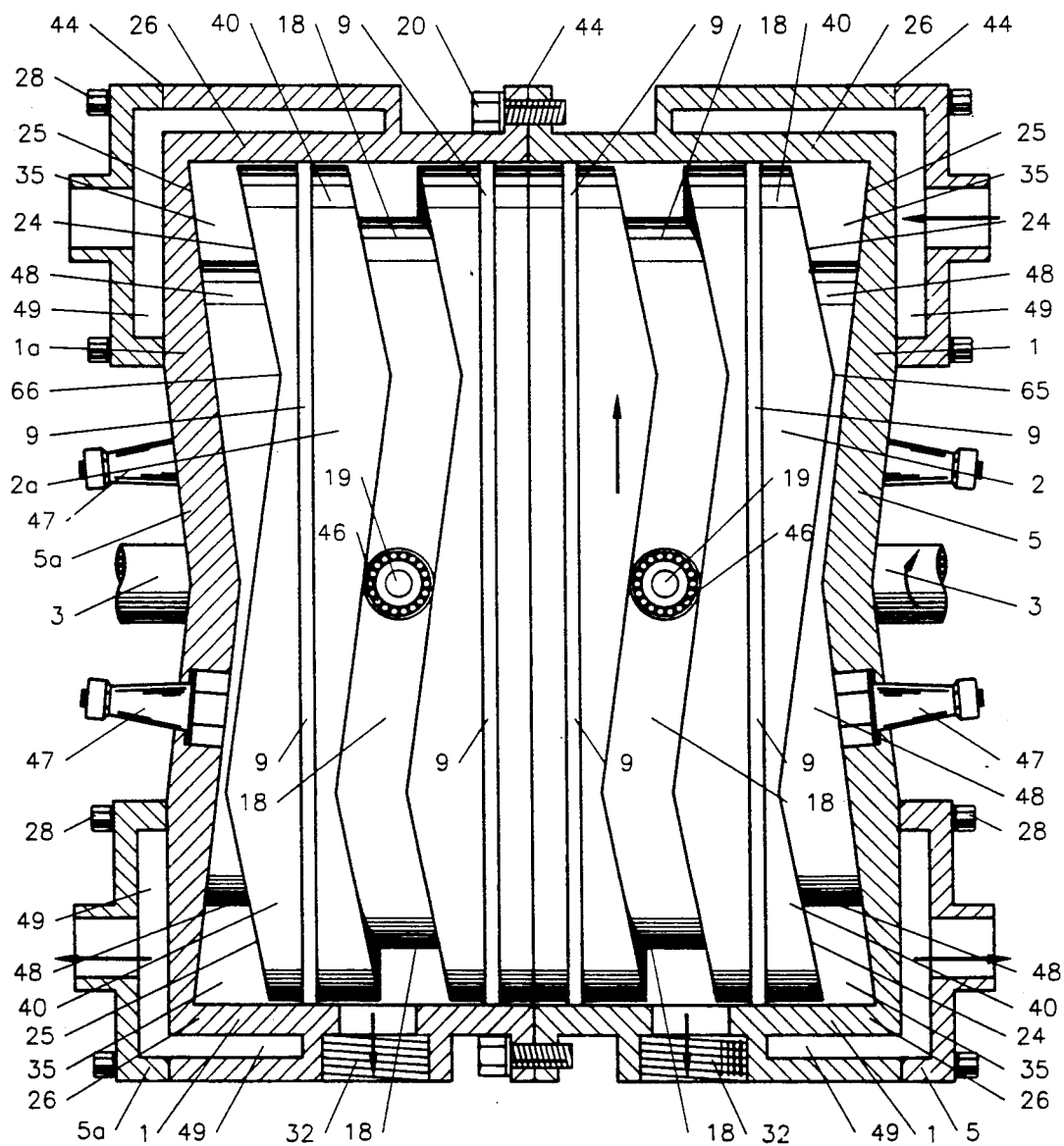
FIG. 41 is a sectional view of a double, 2 cycle, 1 cylinder chamber, engine alone lines 41—41 of FIG. 1.

FIG. 39, 40 and 41 are drawings of a double 2 cycle, 1 cylinder chamber, rotary-reciprocal engine. FIG. 39 is a plan view of a double, 2 cycle, 1 cylinder chamber, rotary-reciprocal engine which includes two engine housings 1, 1a which are bolted 20 together posteriorly so that the maximum front arcuate recessed area 64 of the housing 1 is directly opposite to that 64 of housing 1a, and the fastener of the rotary-reciprocal guides 19 are opposite to each other, the water jackets 5 are bolted 28 to each engine housing 1, 1a, and each has a coolant inlet 16 and a coolant outlet 17; only one engine shaft 3, 4 is utilized and the round area of the engine shaft 3 protrudes out thru the center of both housing's wall. FIG. 40 is a sectional drawing of two engines of FIG. 1, along lines 1—1 which includes two engine housings 1, 1a which is bolted 20 together posteriorly and the cylindrical housing cavities contain two rotatable and reciprocable rotors 2, 2a which are attached together posteriorly by bolts 52 and mounted on an engine shaft 4 which rotates with the rotors and has means for the rotors 2, 2a to reciprocal on a bearing 14. The rotors 2, 2a are bolted together so the crest 65 of the front rotor's piston wave of rotor 2 is directly opposite to the trough 66 of the wave of rotor 2a so that the cylinder chamber 35 of housing 1 has its minimum volume and the cylinder chamber 35 of housing 1a has its maximum volume and allow the expanded exhaust gas to exhaust thru the exhaust port 32 of housing 2a and allows passage of a compressed gaseous mixture to pass into the cylinder chamber 35 of housing 2a through passage way 39 from the front central compression chamber 51 of engine housing 1. The rotor's hub 13 has a seal 12 along with the engine shaft bearings 14 to prevent the gaseous mixture from flowing from each central compression chamber. The central compression chamber has a one way air and/or gaseous mixture port 53 into the central compression chambers along with the one way valve 15. The cylinder chamber of engine housing 2 is closed by means of rings 9 and springs 37 behind the rings. The rotors 2, 2a are guided by the rotor-reciprocal guide groove 18 present on each rotor 2, 2a in which the side walls of the guide groove has 2 evenly spaced waves which match the 2 waves 24 of the front of the rotor's piston 40 and the two arcuate recesses 25 of the housing 1, 1a in the front cylinder chamber wall.

FIG. 41 is a sectional view of a double FIG. 1 engine drawing taken along lines 2—2 and includes engine housing 1, 1a with the peripheral area of the housings removed to show the rotor 2 on the housing 1 being rotated clockwise on the left and the rotor 2a being rotated counter clockwise. The volume of the cylinder chamber 35 of housing 2 on the right is being compressed and the volume of the cylinder chamber 35 of housing 1a on the left is being expanded. The rotary-reciprocal motion of the rotors which are attached together are guided by the rotary-reciprocal guide groove 18 and bearing 46 which is held in place by the attachment 19 which is secured in the peripheral engine housing wall. There are two spark plugs 47 on the front of each housing over the cylinder chamber 35 which fire simultaneously on one engine when the gaseous mixture is compressed to its minimum volume. The exhaust ports 32 are located in the peripheral wall of the housing 1, 1a whereas the intake ports for the gases mixture are located on the inner wall 48 of the housings 1, 1a. The gases mixture passes from the anterior compression chamber 51 of one engine thru the center passage 39 in the rotor's piston of the opposite engine.

Figure 42:
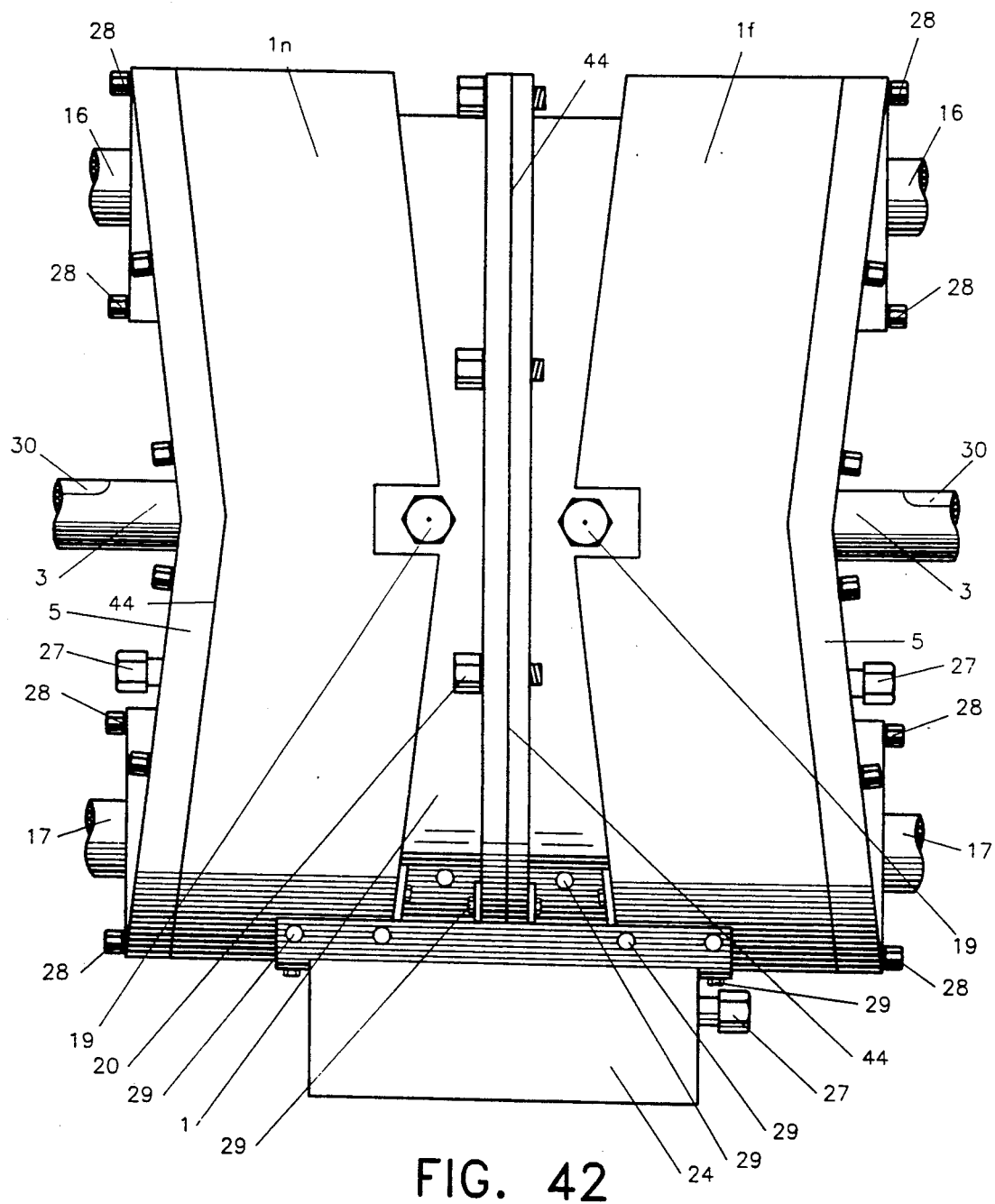
FIG. 42 is a plan view of a double, 4 cycle, 2 cylinder chambers, engine of FIG. 2.
Figure 43:
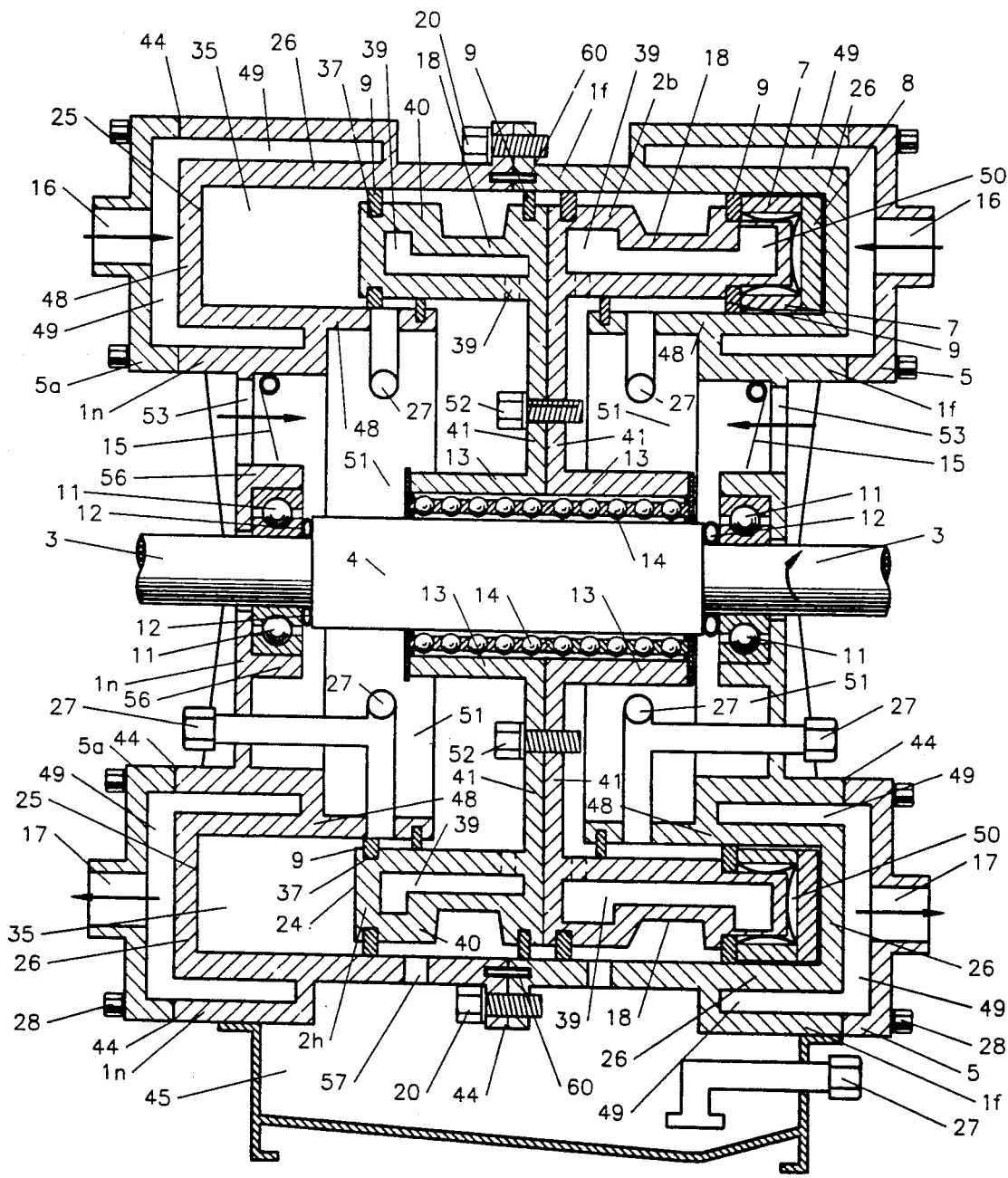
FIG. 43 is a sectional view of a double, 4 cycle, 2 cylinder chambers, engine, alone lines 43—43 of FIG. 2.

FIGS. 42, 43, 44, 45 and 46 are drawings of double 4 cycle, multiple cylinder chambers, rotary-reciprocal engines. FIG. 42 is a plan (side) view of a double 4 cycle, 2 cylinder chambers, rotary-reciprocal engine which includes two housings 1f, 1n of FIGS. 2 and 7 which are attached posteriorly by bolts 20 in a position wherein the maximum arcuate recesses area 64 of engine housing 1f is directly opposite to the maximum arcuate recesses area 64 of engine housing 1n. The fastener 19 for the rotary-reciprocal guide bearing 46 of engine housing 1f is directly opposite to that of engine housing 1n. The posterior housing in FIG. 7 is not used in double engines. One oil pan 24 is included with an oil pipe 27 which has an oil outlet pipe 27 which goes to an oil pump then into the engine thru oil pipe 27. Each housing 1f, 1n is attached by bolts 28 to water jackets 5 which has coolant inlets 16 and outlets 17. The engine shaft 3 extends out from the center of the front of the housing of each housing and only one engine shaft is used. FIG. 43 is a sectional view of double FIGS. 2 and 7 drawings along the lines of 3—3 of FIG. 2 which includes the posteriorly attached housings 1f, 1n with coolant passage 49 and is attached in front by bolts 28 with water jackets 5 which has a coolant intake 16 and outlet 17. There is a one way inlet 53 with a one way valve 15 to the central compression chamber 51 and an outlet 54 from the chamber which is closed. The engine shaft 3 protrudes thru the center of the central front walls of the housing 1f, 1n. Two attached rotors 2b, 2h are rotatable and reciprocal mounted in engine housings 1f, 1n on an engine shaft 4 which rotates with the rotor and has means for the rotors to reciprocate in the shaft by means of a bearing 14. The rotors are attached together by bolts 52 to where the crest of the two waves 65 on the front of the rotor's 2h piston 40 is opposite to the trough 66 of the wave on rotor's 2b piston 40 and engine housing are bolted together to where the 2 maximum arcuate recessed area 64 of housing 1f is opposite to the 2 maximum arcuate recessed area 64 of housing 1n in order to form 2 cylinder chambers 35 with minimum volume in housing 1f and 2 cylinder chambers with maximum volume in housing 1n. The two cylinder chambers 35 of housing 1f and the 2 cylinder chambers of 1n are closed by rings 9 and seals 7, 8n. Oil flows thru oil pipe 27 to the inner side of the cylinder chambers 35 then thru the oil passage 27 thru the rotor's piston to the peripheral area of the cylinder chambers 35 then back thru the oil passage 57 into the oil pan 45.

Figure 44:
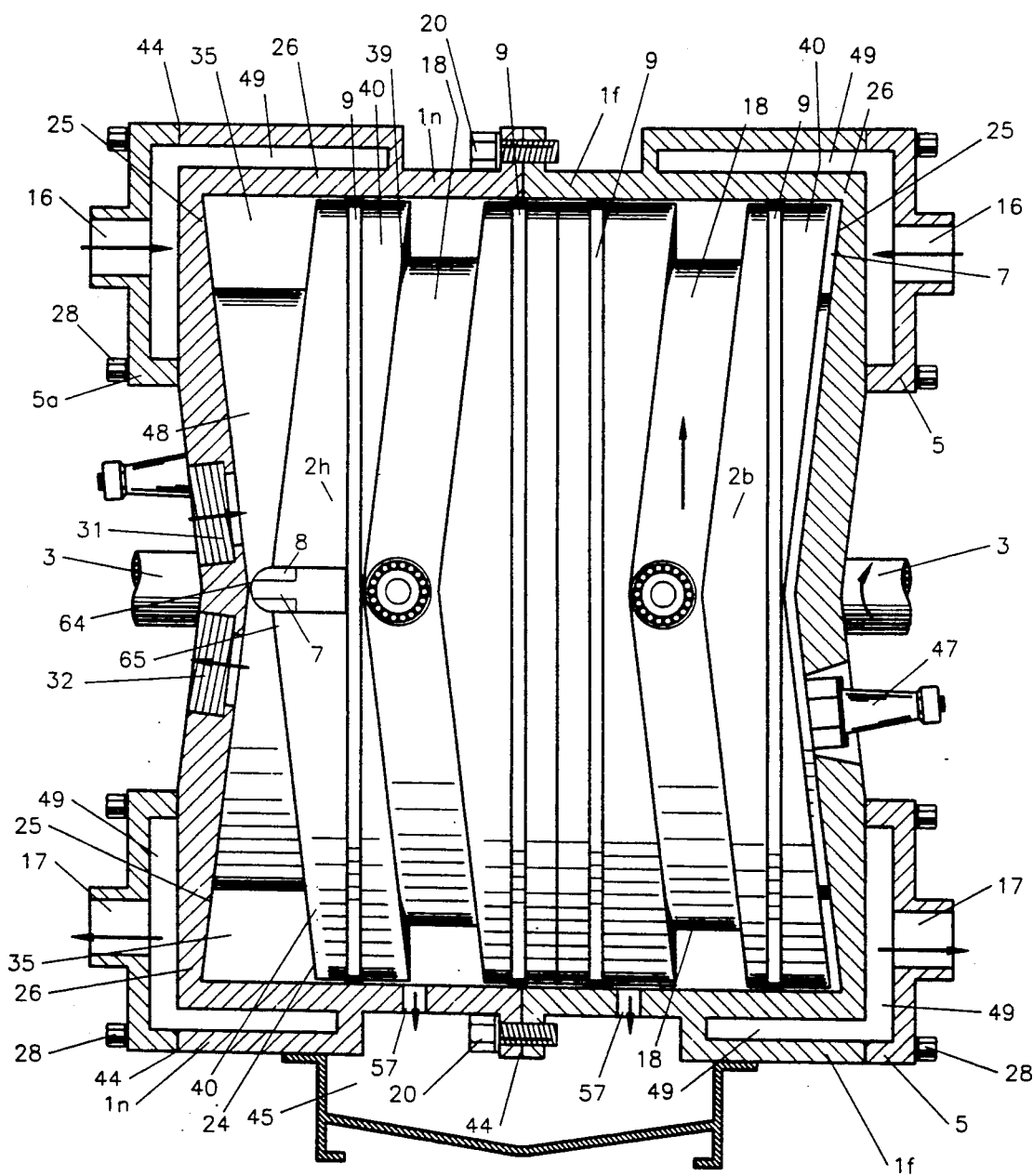
FIG. 44 is a sectional view of a double, 4 cycle, 2 cylinder chambers, engine, alone lines 44—44 of FIG. 2.

FIG. 44 is a sectional drawing of a double 4 cycle, 2 cylinder chambers, rotary-reciprocal engine which is taken along the lines of 4—4 of FIG. 2, which has the peripheral housing walls 1f, 1n removed to show the rotors 2b and 2h. The drawing FIG. 44 includes the double housing 1f, 1n which are attached back to back with bolts 20 in a position to where the maximum arcuate recessed area 64 of housing 1f is directly opposite of maximum arcuate recessed area 64 of housing 1n. Water jackets 5a with inlets 16 and outlets 17 for coolant is bolted 28 to the housing 1f, 1n in front. The rotors 2b, 2h are attached 52 together wherein the trough 66 of the wave 24 on the front of the rotor's 2b piston 40 is opposite to the crest 65 of the wave 24 on the front of rotor's 2h piston 40 and the seals 8 are located on the crest 65 of the waves of both rotor's piston to form 2 closed cylinder chamber 25 with minimum volume in housing 1f and 2 closed cylinder chambers 35 with maximum volume in housing 1n. The rings 9 on each rotor close off the cylinder chamber from each other. The rotors 2b, 2h include rotary-reciprocal guide grooves 18 with side walls shaped like the waves on the front surface of the rotors pistons 40 and has a rotary-reciprocal guide bearing 46 in each groove which is attached to the housing by an attachment 19. The housings 1f, 1n has an inlet port 31 which communicate with one cylinder chamber and an exhaust port 32 which communicates with one cylinder chamber but as the rotor's seal rotates passed the inlet port 31 the exhaust port 32 and inlet port 31 communicate with the same cylinder chamber and the gaseous mixture is compressed in the other cylinder chamber. One spark plug 47 is included in each engine housing and fires when the gaseous mixture maximally compressed and the cylinder chambers 35 volume is starting to expand. The rotors reciprocates on the engine shaft 4 and rotate the shaft and the shaft 3 protrudes out the center of the front wall of the engine housings 1f, 1n. An oil pan 45 is included with an oil passage 57 from the housing's 1f, 1n to the oil pan.

FIG. 45 is a plan (side) view of a double 4 cycle, 4 cylinder chambers, rotary-reciprocal engine which includes two FIG. 3 engines. The drawing includes two cylindrical engine housings 1h, 1o which are posteriorly bolted 2o together with the maximum arcuate recessed area 64 of the front of the engine housing 1h being opposite to the maximum arcuate recessed area 64 of the front of the engine housing 1o to the fastener bolts 19 of engine housing 1h being opposite to the fastener bolts 19 of engine housing 1o. There are water jackets 5 with a coolant inlet 16 and a coolant outlet 17 bolted 28 to the front of the engine housing. There is an oil pan 45 bolted to the inferior peripheral engine housings walls with an oil pipe outlet 27. The front arcuate recessed walls 25 has two spark plugs which are opposite each other and fire at the same time when the gaseous mixture is fully compressed in one engine. There are two exhaust 32 pipes with 1 way exit valve 15 and two inlet 31 pipes with 1 way inlet valves 15 on each front of the housings 1h, 1o. The engine shaft 3 protrudes out from the center of the front housings walls.

Figure 46:
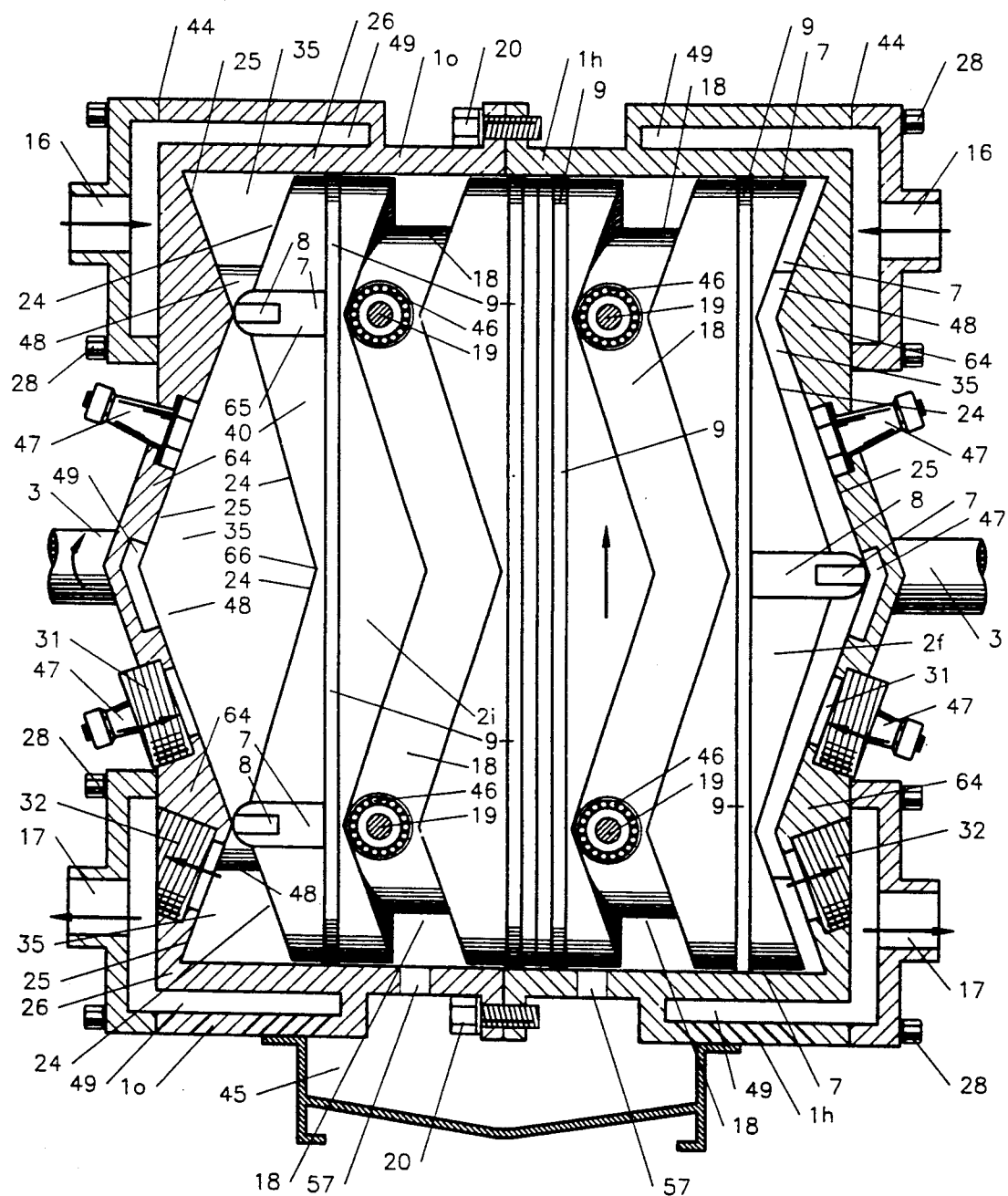
FIG. 46 is a sectional view of a double of two 4 cycle, 4 cylinder chambers, engine, alone lines 46—46 of FIG. 3.

FIG. 46 is a section of double 4 cycle, 4 cylinder chambers, rotary-reciprocal engine of FIG. 3 and taken along lines 4—4 and includes two FIG. 3 engine which are bolted 20 together with the posterior of one engine housing 1h being against the posterior of the other engine housing 1o such that the maximum arcuate recessed areas 64 of the front of the cylinder chamber wall 25 of engine housing 1h are directly opposite to the maximum arcuate recessed are 64 of the front of the cylinder chamber wall 25 of engine housing 1o. The front wall of the engine housing 1h include two spark plugs 47, two exhaust ports 32 and two intake ports 31 and the front wall of the engine housing 1o also has two spark plugs 47, two exhaust ports 32 and two intake ports 31. The engine housing has an attached water jacket 5d with a gasket 44 in front. The attached double rotors 2f, 2i is rotatable and reciprocal mounted in the housings on the engine shaft 4 and the shaft 3 extends thru the front walls of the housings. The two rotors are bolted together to where the trough of the piston's wave 66 of rotor 2i is directly opposite to the crest of the piston's wave 65 of rotor 2f. The rotors are mounted to where cylinder chamber 35 of housing 1h has a minimum volume and the cylinder chamber 35 of housing 1o has a maximum volume. The cylinder chamber 35 is divided into 4 chambers by seals 7, 8 located on the crest of the waves 65 and rings 9. Seals 7, 8 are in contact with the walls of the cylinder chambers.

Figure 53:
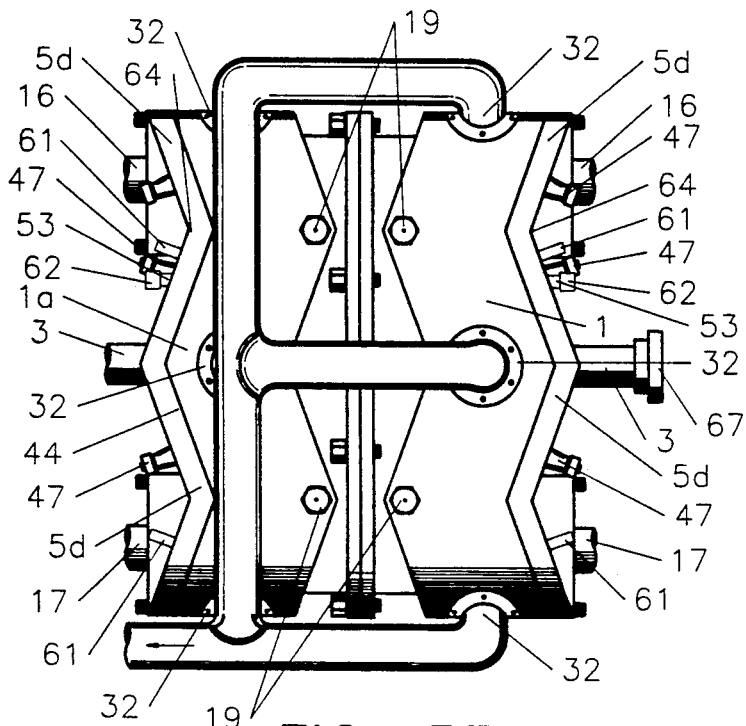
FIG. 53 is a plan view of the housing of a double 2 cycle, 4 cylinder chambers, single rotor, engine.

FIG. 53 is a plan (side) view of the double housing of a 2 cycle, 4 cylinder chamber, rotary-reciprocal engine with a single double end rotor of FIG. 23, which includes two housing 1, 1a which are attached together back to back with the maximum arcuate recessed area 64 of housing 1 is direct opposite of the maximum recessed area 64 of housing 1a, attachment 19 holds the rotor guide bearing in place, there are 4 exhaust ports 32 on the peripheral wall of each housing, there are 4 spark plugs 47 in each cylinder chambers front wall along with 4 fuel injectors 61 (direct fuel injection system or air-assisted fuel injection system) in each housing 1, 1a and an air filter 61 over the one way inlet 53 to the central compression chamber 51. The engine housings 1, 1a are attached in front with water jackets 5 which has a coolant inlet 16 and a coolant outlet 17. The engine shaft 3 extends thru the center of the front walls of the engine housings 1, 1a.

Figure 54:
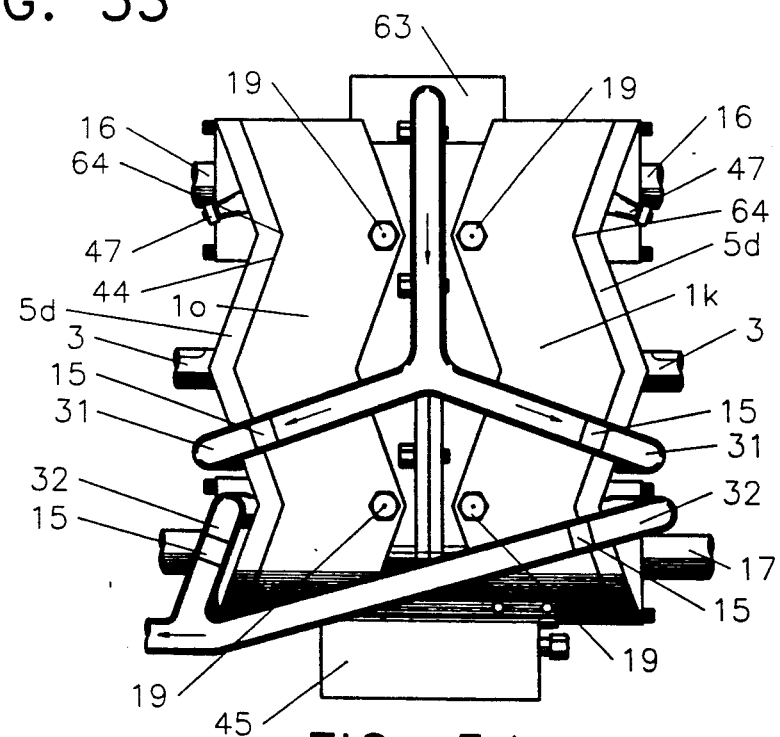
FIG. 54 is a plan view of the housing of a double, 4 cycle, 4 cylinder chamber, single rotor, engine.

FIG. 54 is a plan view of a double housing of a 4 cycle, 4 cylinder chambers, rotary-reciprocal engine which include engine housings 1h, 1o which are attached back to back wherein the maximum arcuate recessed are 64 of housing 1h is directly opposite to the maximum arcuate recessed are 64 of housing 1o. The front of the housings are attached to a water jacket 5d and a gasket 44. The 4 inlet ports 31 on the front housing wall has a passage way to the carburetor 63 and has a 1 way valve 15 to direct the gaseous mixture into the cylinder chamber 51. The 4 exhaust port 32 on the front housings walls are connected to an exhaust system which has a one way valve 15 directing the exhaust gas out of the cylinder chambers. The water jackets 5d has a coolant inlet 16 and a coolant outlet 17. There are two spark plugs 47 in the front wall of both housing and the two fire at the same time. The engine's shaft protrudes out thru the center of the engine housing's 1h, 1o front walls.

OPERATION

The 2 cycle, 1 or 2 cylinder chambers, rotary-reciprocal engines of FIGS. 1, 6, 9, 11, 12, 13, 14 operates with rotor 2 rotating in the clockwise direction and starting from the position of the rotor's 2 piston 40 illustrated in FIG. 6 is in position wherein the waved front portion of the rotor's piston 24 waves are in place between arcuate recesses 25 of the front inner cylinder wall and the cylinder chambers 35 space is at its minimum volume, the rotor 2, controlled by means of the stationary rotary-reciprocal guide bearing which is in contact with the waved side wall of the rotary-reciprocal guide groove 18 and has the same shape as the waved front surface of the rotor's piston 24. The rotor's piston 2 encloses together with the contact or runner surface of the engine housing 1 a working or combustion space 35 which increases during further rotation and reciprocation of the rotor 2 in the clockwise direction and, for example, compresses the fuel-air, oil mixture which has been previously vacuumed in from a carburetor 63 into the posterior compression chamber 6 and increases the cylinder chamber 35 space as the rotor 2 reciprocates to the posterior aspect (dead center) of the cylinder chamber 35 and rotates 90° the exhaust port 32 becomes open and the inlet port 31 become open and the compressed fuel-air, oil mixture from the posterior compression chamber 6 fills the cylinder chamber 35, on further clockwise rotation the rotor is guided to reciprocate toward the front of the engine while rotation and decreasing the volume of the cylinder chamber 35 thereby rotating another 90° while compressing the fuel-air, oil mixture to its minimum volume, then at the termination of the forward stroke the mixture is ignited by means of spark plug 47. While the forward stroke is compressing the mixture a new fuel-air, oil mixture is been aspirated from a carburetor 65 into the posterior compression chamber 6. The rotor's piston 40 is being pressed by the decombustion gases, with simultaneous guided rotation and reciprocation of the rotor 2 and compression of the gaseous mixture in the posterior compression chamber, until the rotor is reciprocated posteriorly to its maximum reciprocation motion (dead center position) and has rotated 90°, therefore reaching the exhaust port 32 and begin to exit on the peripheral side of the rotor's piston 40 and the inlet port 31 is opened on the central side of the rotor's piston 4 thereby letting the compressed fuel-air, oil mixture fill the cylinder chamber 35 and push the remaining burnt gases out of the cylinder chamber 35. The 2 cycle 4 cylinder chambers, rotary-reciprocal engine rotates 45° with each stroke and has 4 ignitions per rotation of 360°.

The 4 cycle, 2 cylinder chambers, rotary-reciprocal engine of FIGS. 2, 7 and 8 operates with rotor 2d rotating in the clockwise direction and starting from the position of the rotor's 2d piston 40 illustrated in FIG. 8 is in position wherein the waved front portion 24 of the rotor's piston is in place between the arcuate recesses 25 of the front inner cylinder wall and the cylinder chamber 35 space is at its minimum volume, the rotor 2d, controlled by means of a stationary rotary-reciprocal guide bearing 46 which is in contact with the waved side wall of the rotary-reciprocal guide groove 18 and has the same wave shape as the waved front surface of the rotor's piston 24 and the same shape as the arcuate recesses 25 of the front inner wall of the cylinder chamber. The rotor's 2d piston 40 encloses together with the contact or runner surface of the engine housing 1f a working or combustion space (cylinder chamber 35) which increases during rotation and reciprocation of the rotor 2d in the clockwise direction and, for example draws in fuel-air mixture for intake port 31. As soon as the rotor's 2d piston 40, after an angular rotation of rotor 2d through 90° and posterior reciprocation of rotor 2d, arrives in the posterior dead center position therefor, the suction stroke is terminated and there commences the compression stroke of the enclosed fuel-air mixture. After a further rotation of the rotor 2d by 90° and reciprocation of the rotor forward to the inner arcuate recesses 25 of the front cylinder chamber wall, the compression stroke of the rotor 2b is terminated and the fuel air mixture compressed thereby is ignited by means of spark plug 47. The rotor's piston 40 is thereby pressed, with simultaneous rotation and posterior reciprocal of the rotor 2b into near posterior dead center position thereof whereupon the rotor 2b opens up the exhaust port 32 so that the burnt gases may be discharged. During the previous described suction stroke which takes place in one cylinder chamber 35 an ignited gaseous mixture expansion takes place in the second chamber then during the previous described compression stroke in one chambers an expelling of the exhaust fumes takes place in the other chamber. There are 2 ignitions of the fuel-air mixture per 360° rotation.

The 4 cycle, 4 chambers, rotary-reciprocal engine of FIGS. 3, 24 and 56 has the same suction stroke, compression stroke, expansion stroke and exhaust stroke as described for the 4 cycle, 2 chamber, rotary-reciprocal engine except that two strokes of each are taken place at the same time and there are 4 double ignition per 360° rotation.

The 4 cycle, 3 chambers, rotary-reciprocal engine has an addition chamber where the compressed fuel-air mixture is decompressed then recompressed before ignition takes place in order to heat the fuel-air mixture. The other two chambers function the same as that described above for a 4 cycle, 2 chambers rotary-reciprocal engine and has two ignitions per 360° rotation. The 4 cycle, 6 chambers rotary-reciprocal engine of FIG. 4, strokes of suction fill 3 cylinder chambers, strokes of compression compress 3 cylinders chambers, strokes of expansion expand the ignited gas in 3 cylinder chambers and the strokes of exhaustion it exhausts 3 cylinder chambers at the same time. It also has 3 spark plug which ignites the compressed fuel-air mixture in the 3 cylinder chambers at the same time and has 6 triple ignitions per 360° rotation.

Double 2 cycle, 1 or 2 cylinder chamber, rotary-reciprocal engine operates the same as the single 2 cycle, 1 or 2 chamber, rotary-reciprocal engine described above except that the engine of FIGS. 39, 40, 41 and 53 doesn't have a posterior compression but the central compression chambers 51 draws in the fuel-air, oil mixture thru the inlet 53 and compresses the fuel-air, oil mixture. The central compression chamber of housing 1 communicates with the cylinder chamber 35 of housing 1a and the central compression chamber 51 of housing 1a communicates with the cylinder chamber of housing 1. The housings 1, 1a and rotors 2, 2a so attached and mounted as in FIG. 40 so that the cylinder chamber 35 volume of housing 1 is at its minimum and the cylinder chamber 35 volume of housing 1a is at its maximum, (at dead center) and allows exhaust gases to flow out exhaust port 32 and the compressed fuel-air mixture to pass into the cylinder chamber 35 of housing 1a from the central compression chamber of housing 1. The step of expansion in the cylinder chamber 35 of housing 1 takes place at the same time as step of compression in the cylinder chamber 35 of housing 1a; then the stroke of expansion of the cylinder chamber of housing 1a takes place at the same time as the stroke of compression of the cylinder chamber of housing 1 when rotor 2 is rotating clockwise. The strokes of intake and exhaustion are done at the same time when the rotors 2, 2a are at dead center (maximum posterior reciprocation). The ignition of the compressed fuel-air, oil mixture in the cylinder chamber 35 of housing 1 takes place by means of a spark plug 47 and the rotor's piston 40 is thereby pressed and simultaneous reciprocation and rotation of the rotors 2, 2a for 90° and rotor 2 goes to dead center and rotor 2a compresses the fuel-air, oil mixture in the cylinder chamber of housing 1a. The expanded burnt gases is exhausted from the cylinder chamber 35 of housing 1 and the compressed fuel-air mixture from central compression chamber of housing 1a flows into the cylinder chamber of housing 1 then the compressed fuel-air, oil mixture in cylinder chamber 35 of housing 1a is ignited by means of a spark plug 47 and the rotor's piston 40 is thereby pressed, with simultaneous reciprocation and rotation of the rotor 2a by 90° to dead center at the same time compressing the fuel-air, oil mixture in the cylinder chamber of housing 1. The expanded exhaust gas passes out thru the exhaust port 32 and the compressed fuel oil mixture from the central compression chamber of housing 1 flows into the cylinder chamber 35 of housing 1a. There are two ignition per engine (total of 4) per 360° rotation.

Double 4 cycle, 2 or more cylinder chambers, rotary-reciprocal engine of FIGS. 42, 43, 44, 45, 46 and 54 operates the same as the single 4 cycle 2 or more cylinder chambers, rotary-reciprocal engine described above except that the double engine does not have posterior compression chambers. The housings 1f, 1n and rotors 2b, 2h so attached and mounted as in FIG. 43 so that the cylinder chamber's volume of housing 1f, 1n and rotors 2b, 2h so attached and mounted as in FIG. 43 so that the cylinder chamber's volume of housing 1f is at its minimum volume and the cylinder chamber's volume of housing 1n is at its maximum volume (at dead center or maximum posterior reciprocation). The stroke of expansion in housing 1f takes place at the same time as the stroke of compression takes place in housing 1n in one cylinder chamber 35 when rotor 2b rotates clockwise and in the other cylinder chamber of housing 1f the stroke of suction takes place and in the other cylinder chamber of housing 1n the stroke of exhaustion takes place at the same time. The ignition of compressed fuel-air mixture in the cylinder chamber 35 housing 1f takes place by means of a spark plug 47 and the rotor's 2b piston 40 is thereby pressed and simultaneous reciprocation and clockwise rotation of rotor 2b for 90° and rotor 2h goes from dead center and compresses aspirate fuel-air mixture while at the same time in the other cylinder chamber of housing 1f a fuel-air mixture is aspirated thru inlet port 31 and in the other cylinder chamber 35 of housing 1n expanded exhaust gases are exhausted thru the exhaust port 32. There are two ignitions for each motor (total of 4) per 360° of engine shaft rotation.

Double 4 cycle, 4 cylinder chambers, rotary-reciprocal engine of FIG. 46 operates the same as the 4 cycle, 2 cylinder chambers, rotary-reciprocal engine described above except that there are two cylinders chambers for the strokes of aspiration and compression and two cylinders chambers for the strokes of expansion and exhaustion in each engine so that there are two spark plugs 47 igniting at the same time on each engine and the spark plugs are located opposite each other to balance the force applied to the rotors. The engine's two spark plugs 47 in one engine fire every time the rotor rotates clockwise 45° and then the other engine fires it two spark plug 47 and the rotors rotate 45°. There are 4 ignitions for each engine or a total of 8 ignitions per 360° rotation of the rotors.

Double 4 cycle, 6 cylinder chambers, rotary-reciprocal engine consisting of two engines of FIG. 4 operates the same as the double 4 cycle 2 cylinder chamber, rotary-reciprocal engines described above except that each engine would have 3 cylinder chambers 35 for the strokes of aspiration and compression and 3 cylinder chambers 35 for the strokes of expansion and exhaustion in each engine so that there are three spark plugs 47 igniting at the same time on each engine. There are 6 ignitions for each engine or a total of 12 ignitions per 360° rotation of the rotors.

It will be understood that various changes and modifications may be made in the constructions described which provide the characteristics of this invention without departing from the spirit thereof particularly as defined in the following claims.

I claim:

1. An internal combustion engine of the rotary-reciprocal type comprising, a housing formed with a peripheral wall with side walls which contains a cylindrical inner wall attached to one said side wall at 90°, inner surface of said peripheral wall being cylindrical, a rotor having a peripheral circular piston having equally spaced wave-shaped side wall, rotatably and reciprocal mounted in said housing, a shaft for said rotor, extending through said side walls and has means for the rotor to reciprocate on shaft and shaft rotates with rotor, said housing having a lateral and peripheral circular cylinder chamber having equally spaced arcuate recesses extending into said cylinder chamber's side wall, the number and shape of recesses being equal to the number and shape of waves on the piston's side wall and the number being 2 or more, piston's waves movable mounted in each of said arcuate recesses respectively, the rotor's piston's peripheral and inner circular surface remaining in sealing contact with the inner peripheral wall and peripheral surface of the circular inner wall at all times and seals on the crest of waves of the piston remaining in sealing contact with the inner wall's peripheral surface, peripheral housing wall's inner surface and arcuate recesses of said side wall and forming variable volume cylinder chambers between the rotor's piston's waved side wall and said cylinder chamber walls, said housing being provided with means admitting a gaseous mixture communicating with one half of sealed said cylinder chambers, means discharging combustion products communicating with one half of sealed said chambers and ignition means communicating with one half of sealed said cylinder chambers, means to guide rotor's rotary and reciprocal motions in said housing, said cylinder chambers of varing sizes enabling a compression of a gasous mixture to take place after suction, ignition of said compressed gaseous mixture and expansion of said chambers due to the pressure of said combustion products.

2. The engine according to claim 1, wherein the peripheral wall of said housing is provided with exhaust ports extending therethrough and the cylindrical inner wall of said housing is provided with intake ports extending therethrough, said ports being adapted to be opened or closed by said rotor during rotation and reciprocation and constituting said means for admission of combustion mixture and means for discharging the combustion products.

3. The engine according to claim 1, wherein the arcuated recessed side wall of said housing is provided with exhaust ports extending therethrough and is provided with intake ports extending therethrough, said ports being adapted to be opened or closed by said rotor during rotation and reciprocation and constituting said means for admission of combustion mixture and means for discharging the combustion products.

4. The engine according to claim 2 wherein 1 or 2 compression chambers are formed between the rotor and housings side walls and provided with a one way inlet for a gas or a gaseous mixture to flow into the compression chamber then compressed and has means to deliver the gas or a gaseous mixture to the said intake port.

5. A double internal combustion engine of the rotary-reciprocal type comprising, a housing formed with a peripheral wall with side walls which contains bilateral circular inner walls on each wall at 90° to side walls, inner surface of said peripheral wall being cylindrical, a rotor having two laterally and peripherally located pistons, each having equally placed wave-shaped sidewall, rotatably and reciprocal mounted in said housing, a shaft for said rotor extending through said side walls and having means for the rotor to reciprocate on the shaft rotates with rotor, said housing having bilateral and peripheral circular cylinder chambers having equally spaced arcuate recesses extending into cylinder chamber's side walls, the number and shape of recesses being equal to the number and shape of the waves on the pistons and the number being 2 or more on each side wall, having the crest of the wave of one piston being directly opposite to the trough of the wave of the other piston, one piston's waves is movably mounted in each of said arcuate recesses respectively with piston's peripheral wall, inner peripheral wall, inner peripheral wall and crest of the waves surfaces remaining in sealing contact with cylinder chambers walls, the other piston is movably mounted wherein the crest of the waves of this piston is directly opposite to the maximum area of recess on the arcuate recesses of the other cylinder chamber wall with piston's peripheral wall, inner peripheral wall and crest of the waves surfaces remaining in sealing contact with cylinder chambers walls, said housing being provided with means admitting a gaseous mixture communicating with one half of sealed said cylinder chambers on each side, means discharging combustion products communicating with one half of sealed said cylinder chambers on each side, and ignition means communicating with one half of sealed said cylinder chambers on each side, means to guide rotor's rotary and reciprocal motions in said housing, said cylinder chambers of varing sizes enabling a compressing of a gaseous mixture to take place after suction, ignition of said compressed gaseous mixture and expansion of said chambers due to the pressure of said combustion products.

6. The double engine of claim 5 wherein the peripheral wall of said housing provided with exhaust ports for the bilateral cylinder chambers extending therethrough and the bilateral circular inner walls of said housing is provided with intake ports extending therethrough, said ports being adapted to be opened or closed by said rotor during rotation and reciprocation and constituting said means for admission of combustion mixture and means for discharging the combustion products.

7. The double engine according to claim 5, wherein the arcuate recessed side walls of said housing is provided with exhaust ports extending therethrough and is provided with intake ports extending therethrough, said ports being adapted to be opened or closed by said rotor during rotation and reciprocation and constituting said means for admission of combustion mixture and means for discharging the combustion products.

8. The double engine of claim 5 wherein two of these engines shaft are attached together thereby forming a quadruple engine.

9. A double rotary-reciprocal combustion engine having a cycle which includes the four strokes of intake, compression, expansion and exhaust; said engine comprising:

a) a housing formed with a peripheral wall with side walls, the inner surface of said peripheral wall being cylindrical, having bilateral and peripherally spaced cylinder chambers wherein each are formed with walls consisting of the inner circular surface of the peripheral housing wall, a peripheral area of one side wall and one of the bilateral inner circular walls with each inner circular wall being attached to different side walls of the housing and both extending parallel with the peripheral wall toward the center of the housing cavity thereby leaving space in the middle of the housing for the rotor to rotate and reciprocate, both said side walls having equally spaced arcurate recesses projecting into the cylinder chambers with the maximun recessed area of the arcuate recesses on one side wall being directly opposite to the maximun recessed area on the other side wall, being provided with two anterior central compression chambers which are separated by the rotor, being provided with means for admitting a gas or a liquid into the anterior central compression chamber, means for discharging a gas or liquid from the anterior central compression chambers;

b) a rotor formed with a thick peripheral wall and a center wall at 90° to the peripheral wall, said peripheral wall is cylindrical, said thick peripheral wall are the rotor's pistons, one on each side of the center wall, rotor pistons having equally spaced waves on both ends of the thick peripheral wall at 90° to the peripheral wall, said waves being of equal number and shape as said arcuate recesses, wherein the number is greater than 2 on each side of the rotor, having the crest of the wave on one piston being directly opposite to the trough of the wave on the other piston, said rotor's center wall having a centrally located hub which extends at 90° bilaterally from the center wall and hub having an opening for an engine shaft, the rotor's piston having means to divide the housing's cylinder chambers into 2 or more sealed cylinder chambers on each side of housing, rotor is rotarally and reciprocally mounted in said housing cavity with the rotor's piston waves movably mounted in each of said arcuate recesses respectively in sealing contact with said cylinder chamber walls on one side of the rotor the crest of the piston's waves are directly opposite to the most recessed area of the arcuate recesses respectively remaining in sealing contact with said cylinder chamber walls;

c) a shaft mounted in the center of housing cavity, passing through the rotor's hub and extending through the side walls of the housing, having means to allow the rotor to reciprocate on the shaft while the shaft is rotating with the rotor;

d) a reciprocal and rotary guide having means to guide the rotor's rotary and reciprocal motions while keeping the rotor's pistons in continous sealing contact with said cylinder chambers walls and varing the volume of the cylinder chambers enabling a compression of a gaseous mixture to take place in one half of the sealed cylinder chambers after aspirating a gaseous mixture into these sealed cylinder chambers on one side of the housing;

e) ignition system having means for igniting compressed gaseous mixture in one half of the sealed cylinder chambers on each side of the housing and expanding of said cylinder chambers due to said combustion products.

10. A double internal combustion engine of the rotary-reciprocal type comprising, a housing with cylinderical inner peripheral wall, side walls and an inner circular wall attached to each side wall which extends parallel with the peripheral wall and the inner wall does not meet in the center in order to leave room for the rotor to rotate and reciprocate thereby forming a circular cylinder chamber in each peripheral and lateral aspect of the inner housing with the side walls of the bilateral cylinder chambers having equally spaced arcuate recesses extending into cylinder chambers, the number and shape of the recesses being equal to the number and shape of the waves on the pistons and the number being 4 or more on each side wall; a rotor having two laterally and peripherally located cylindrical shape pistons, each having equally placed wave-shaped side walls, rotatably and reciprocally mounted in said housing and having seals on the crest of the piston waves and rings to divide the cylinder chambers into 4 or more sealed cylinder chambers on each side of housing, having the crest of the wave of one piston directly opposite to the trough of the wave of the other piston, one piston's waves are movably mounted in each of said arcuate recesses respectively with piston's peripheral wall, inner peripheral wall and crest of the waves surfaces remaining in sealing contact with cylinder chamber walls, the other piston is movably mounted wherein the crest of the waves of this piston is directly opposite to the maximun area of recess on the arcuate recesses of the adjacent cylinder chamber wall with piston's peripheral wall and side wall with crest of the waves surfaces remaining in sealing contact with cylinder chamber walls; a shaft for said rotor extending through said side walls and having means for the rotor to reciprocate on the shaft while shaft rotates with the rotor; said housing being provided with means admitting a gaseous mixture communicating with one half of said sealed cylinder chambers, means discharging combustion products communicating with one half of said sealed cylinder chambers, ignition means communicating with one half of said sealed cylinder chambers, means to guide rotor's rotary and reciprocal motions in said housing, said cylinder chambers of varing sizes enabling a compression of a gaseous mixture to take place after suction, ignition of said compressed gaseous mixture and expansion of said chambers due to the pressure of said combustion products; a central chamber in the housing, sealed from the cylinder chambers and divided into two sealed chambers by the rotor, said housing being provided means admitting a liquid, a gas and/or a gaseous mixture communicating with each said central chamber and means discharging said liquid, gas and/or gaseous mixture communicating with each said central chamber.

* * * * *